US006806452B2

(12) United States Patent
Bos et al.

(10) Patent No.: US 6,806,452 B2
(45) Date of Patent: Oct. 19, 2004

(54) INTERIOR REARVIEW MIRROR SYSTEM INCLUDING A FORWARD FACING VIDEO DEVICE

(75) Inventors: Brent J. Bos, Tucson, AZ (US); Kenneth Schofield, Holland, MI (US); Mark L. Larson, Grand Haven, MI (US); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 190 days.

(21) Appl. No.: 10/011,517

(22) Filed: Nov. 5, 2001

(65) Prior Publication Data

US 2002/0056805 A1 May 16, 2002

Related U.S. Application Data

(63) Continuation-in-part of application No. 09/776,625, filed on Feb. 5, 2001, now Pat. No. 6,611,202, and a continuation-in-part of application No. 09/599,979, filed on Jun. 22, 2000, now Pat. No. 6,320,176, and a continuation-in-part of application No. 09/530,306, filed on Apr. 27, 2000, now Pat. No. 6,353,392, which is a continuation of application No. 09/346,352, filed on Jul. 2, 1999, now Pat. No. 6,313,454, which is a continuation of application No. 09/313,139, filed as application No. PCT/US98/23062 on Oct. 30, 1998, now Pat. No. 6,222,447, which is a continuation of application No. 09/135,565, filed on Aug. 17, 1998, now Pat. No. 6,097,023, which is a continuation of application No. 08/935,336, filed on Sep. 22, 1997, now Pat. No. 5,949,331.
(60) Provisional application No. 60/064,335, filed on Oct. 30, 1997.

(51) Int. Cl.[7] .................. H01L 27/00; G01N 21/47; G01N 21/00; B60Q 1/00
(52) U.S. Cl. .............. 250/208.1; 250/573; 250/574; 356/237.3; 340/435
(58) Field of Search ................ 250/573, 574, 250/208.1, 559.4, 559.41, 214 R, 214 C, 214 AL; 356/338, 343, 436, 445, 446, 237.3; 340/435, 436

(56) References Cited

U.S. PATENT DOCUMENTS 2,632,040 A 3/1953 Rabinow ............. 175/321

(List continued on next page.)

FOREIGN PATENT DOCUMENTS

DE 294656 1 A 5/1981

(List continued on next page.)

OTHER PUBLICATIONS

Commonly assigned, co–pending U.S. patent application, Ser. No. 09/441,341 filed Nov. 16, 1999 by Kenneth (NMI) Schofield, Mark L. Larson and Keith J. Vadas for Vehicle Headlight Control Using Imaging Sensor.

(List continued on next page.)

Primary Examiner—David Porta
Assistant Examiner—David C. Meyer
(74) Attorney, Agent, or Firm—Van Dyke, Gardner, Linn & Burkhart, LLP

(57) ABSTRACT

An interior rearview mirror system suitable for use in a vehicle includes a interior rearview mirror assembly adapted for attachment to an interior portion of the vehicle. The interior rearview mirror assembly includes a housing and a reflective element included within the housing. The mirror system further includes a video device (which includes an imaging sensor) and a control. The imaging sensor is positioned at the interior rearview mirror assembly and has a field of view forward and through the windshield. The imaging sensor is operable to at least sense precipitation at an interior and/or exterior surface of the windshield. The control receives a signal from the imaging sensor and is operable to control at least one of a headlamp of the vehicle, a windshield wiper of the vehicle, a defogging system of the vehicle and a movable window of the vehicle in response to the signal.

140 Claims, 10 Drawing Sheets

U.S. PATENT DOCUMENTS

| | | |
|---|---|---|
| 2,827,594 A | 3/1958 | Rabinow ............... 315/83 |
| 4,037,134 A | 7/1977 | Löper ................. 315/78 |
| 4,236,099 A | 11/1980 | Rosenblum |
| 4,355,271 A | 10/1982 | Noack ................ 318/480 |
| 4,357,558 A | 11/1982 | Massoni et al. ....... 315/83 |
| 4,481,450 A | 11/1984 | Watanabe et al. ...... 318/444 |
| 4,620,141 A | 10/1986 | McCumber et al. ...... 318/483 |
| 4,692,798 A | 9/1987 | Seko et al. .......... 358/93 |
| 4,727,290 A | 2/1988 | Smith et al. ......... 315/82 |
| 4,862,037 A | 8/1989 | Farber et al. ........ 318/83 |
| 4,867,561 A | 9/1989 | Fujii et al. ......... 356/237 |
| 4,871,917 A | 10/1989 | O'Farrell et al. ..... 250/341 |
| 4,891,559 A | 1/1990 | Matsumoto et al. ..... 315/82 |
| 4,917,477 A * | 4/1990 | Bechtel |
| 4,956,591 A | 9/1990 | Schierbeek et al. .... 318/483 |
| 4,967,319 A | 10/1990 | Seko ................. 362/61 |
| 5,059,877 A | 10/1991 | Teder ................ 318/444 |
| 5,072,154 A | 12/1991 | Chen ................. 315/82 |
| 5,086,253 A | 2/1992 | Lawler ............... 315/83 |
| 5,124,549 A | 6/1992 | Michaels et al. ...... 250/237 |
| 5,182,502 A | 1/1993 | Slotkowski et al. |
| 5,313,072 A * | 5/1994 | Vachss |
| 5,329,206 A | 7/1994 | Slotkowski et al. .... 315/159 |
| 5,336,980 A | 8/1994 | Levers ............... 318/444 |
| 5,414,257 A | 5/1995 | Stanton .............. 250/227.25 |
| 5,426,294 A | 6/1995 | Kobayashi et al. |
| 5,471,515 A | 11/1995 | Fossum et al. ........ 377/60 |
| 5,498,866 A | 3/1996 | Bendicks et al. ...... 250/227.25 |
| 5,535,314 A | 7/1996 | Alves et al. ......... 395/131 |
| 5,537,003 A | 7/1996 | Bechtel et al. |
| 5,550,677 A | 8/1996 | Schofield et al. |
| 5,661,303 A | 8/1997 | Teder ................ 250/341.8 |
| 5,670,935 A | 9/1997 | Schofield et al. ..... 340/461 |
| 5,760,962 A | 6/1998 | Schofield et al. ..... 359/604 |
| 5,796,094 A | 8/1998 | Schofield et al. ..... 250/208 |
| 5,837,994 A | 11/1998 | Stam et al. |
| 5,844,682 A | 12/1998 | Kijomoto et al. ...... 356/369 |
| 5,877,897 A | 3/1999 | Schofield et al. |
| 5,923,027 A * | 7/1999 | Stam |
| 5,949,331 A | 9/1999 | Schofield et al. ..... 340/461 |
| 5,990,469 A | 11/1999 | Bechtel et al. ....... 250/208.1 |
| 6,020,704 A | 2/2000 | Buschur .............. 318/483 |
| 6,084,519 A * | 7/2000 | Coulling |
| 6,087,953 A | 7/2000 | DeLine et al. ........ 340/815.4 |
| 6,097,023 A | 8/2000 | Schofield et al. ..... 250/208.1 |
| 6,097,024 A | 8/2000 | Stam et al. .......... 250/208.1 |
| 6,124,886 A | 9/2000 | DeLine et al. ........ 348/148 |
| 6,144,022 A | 11/2000 | Tennenbaum et al. .... 250/208.1 |
| 6,172,613 B1 | 1/2001 | DeLine et al. ........ 340/815.4 |
| 6,222,447 B1 | 4/2001 | Schofield et al. ..... 340/461 |
| 6,313,454 B1 | 11/2001 | Bos et al. ........... 250/208.1 |
| 6,320,176 B1 | 11/2001 | Schofield et al. ..... 250/208.1 |

FOREIGN PATENT DOCUMENTS

| | | |
|---|---|---|
| DE | 4139515 A1 | 6/1992 |
| DE | 4123641 A1 | 1/1993 |
| EP | 0 788 947 A1 * | 2/1994 |
| FR | 2641237 A | 7/1990 |
| JP | 6243543 | 2/1987 |
| WO | WO 8605147 A | 9/1986 |
| WO | 9427262 | 11/1994 |
| WO | 9814974 | 4/1998 |
| WO | 9914088 | 3/1999 |
| WO | 9923828 | 5/1999 |

OTHER PUBLICATIONS

Article entitled "Generation of Vision Technology," published by VLSI Vision Limited, publication date unknown.

Article entitled "On–Chip CMOS Sensors for VLSI Imaging Systems," published by VLSI Vision Limited, 1991.

* cited by examiner

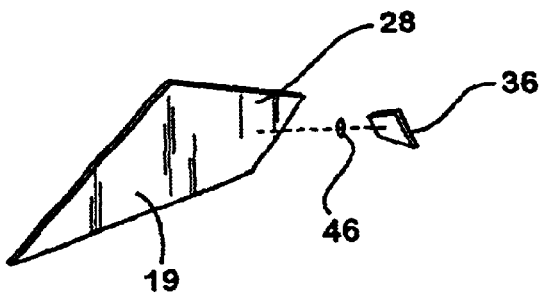
Fig. 3a
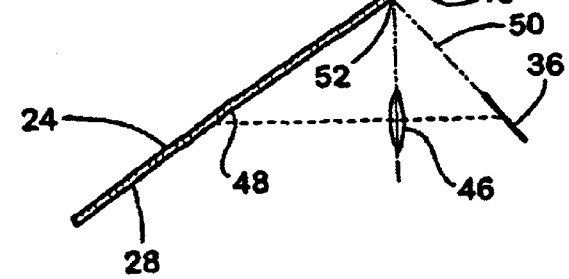
Fig. 3b
Fig. 3c
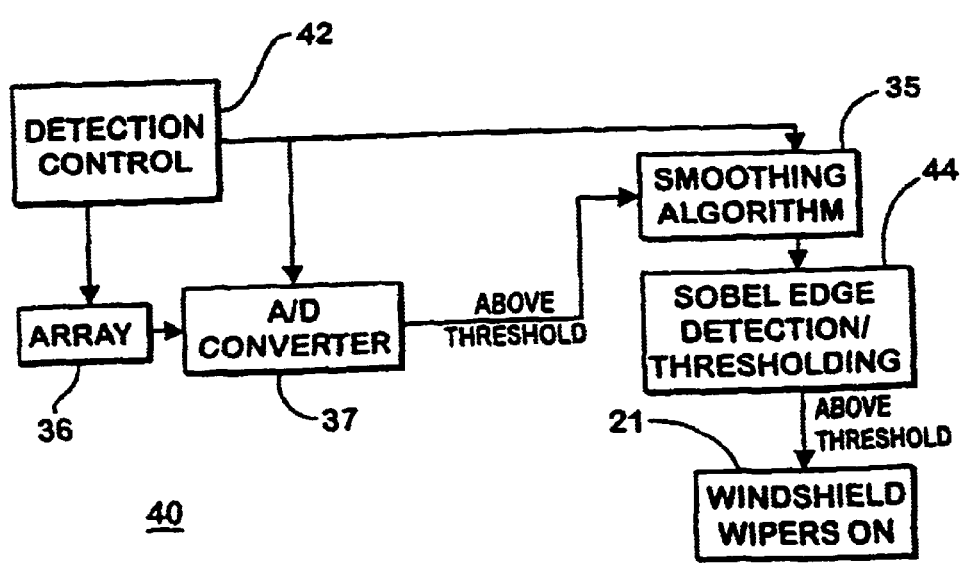
Fig. 4

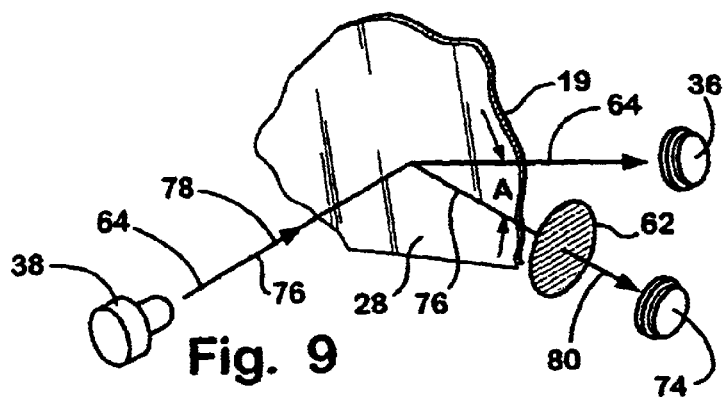
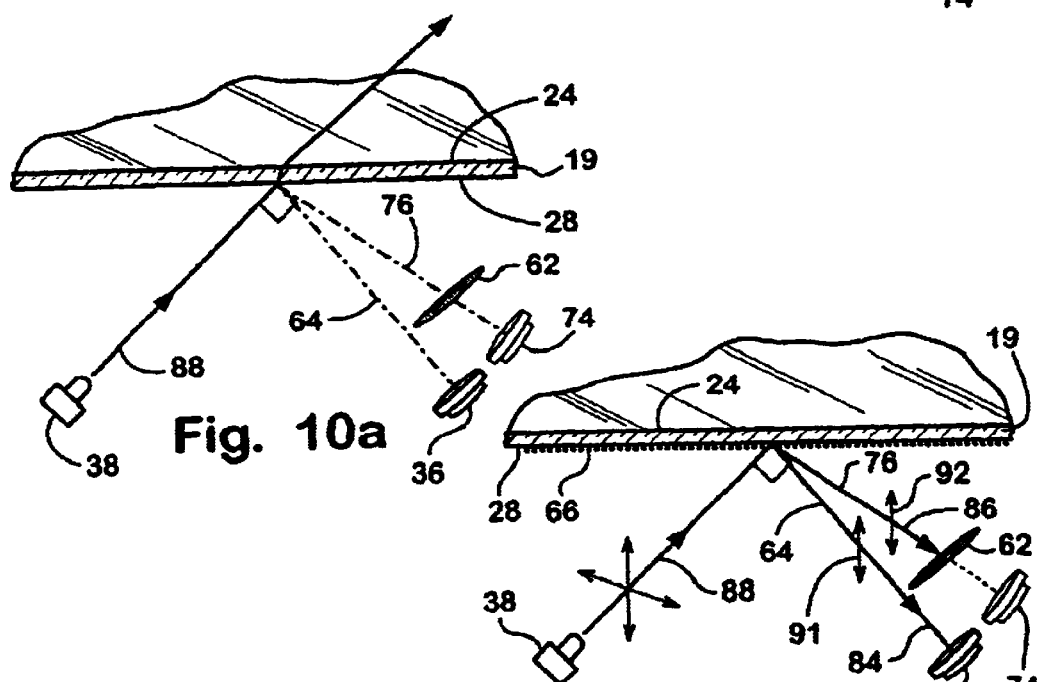
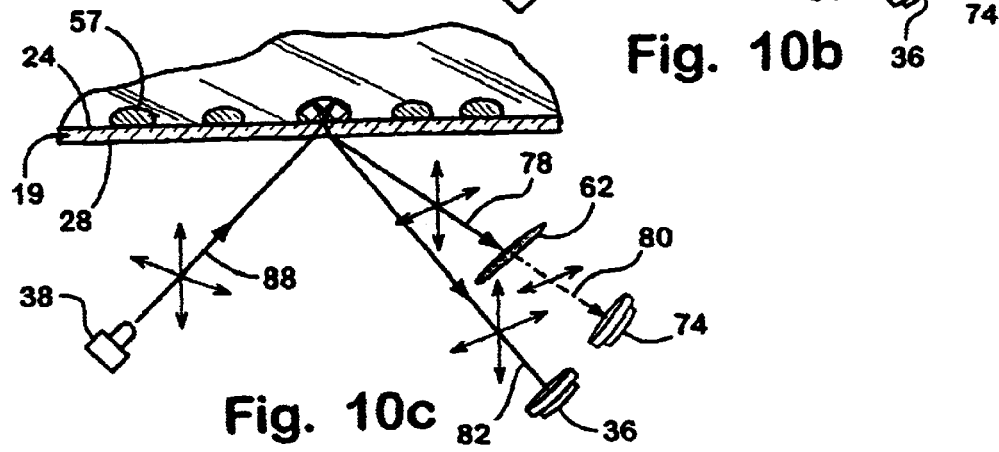

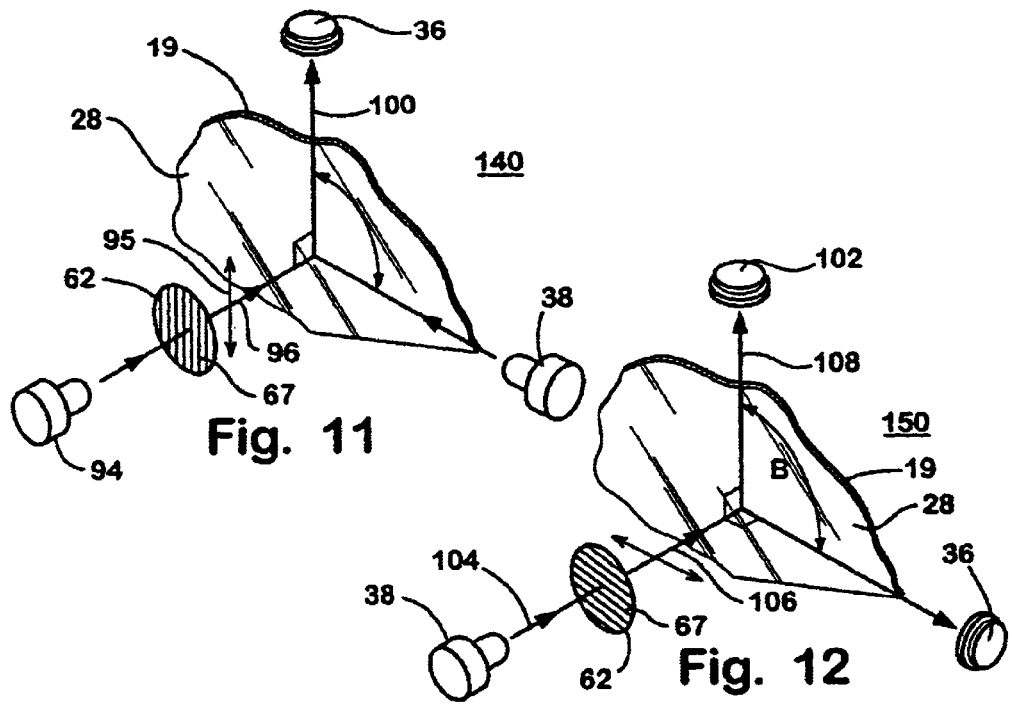
Fig. 11
Fig. 12
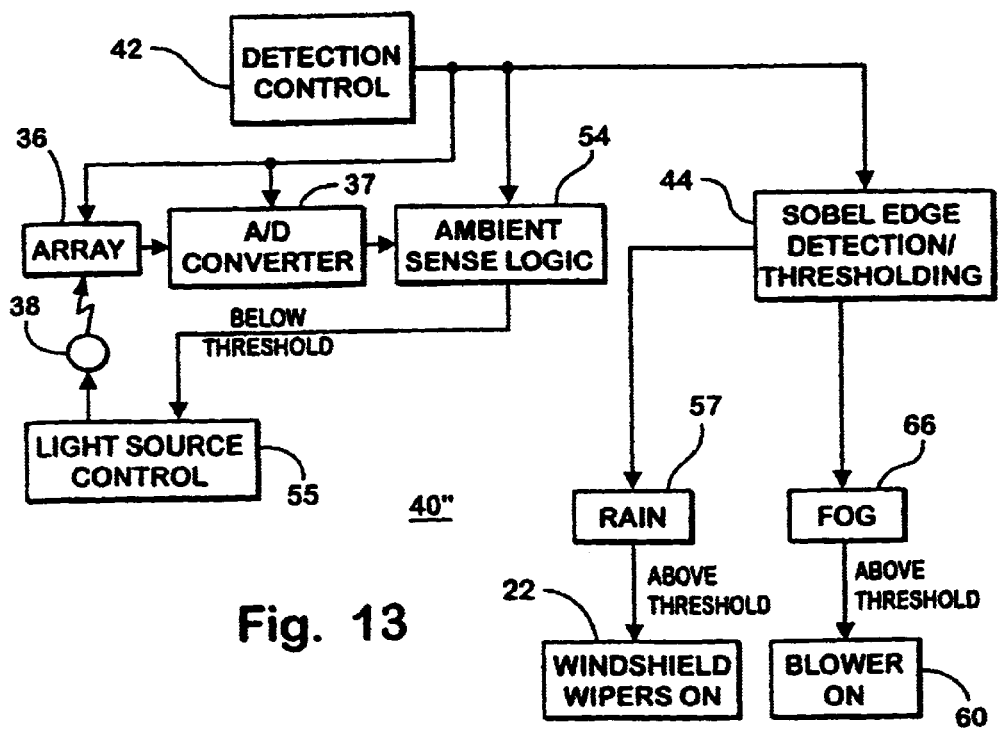
Fig. 13

INTERIOR REARVIEW MIRROR SYSTEM INCLUDING A FORWARD FACING VIDEO DEVICE

CROSS-REFERENCE TO RELATED APPLICATIONS

This is a continuation of U.S. patent application Ser. No. 09/346,352, filed Jul. 2, 1999 by Brent J. Bos et al. for RAIN SENSOR, now U.S. Pat. No. 6,313,454; and a continuation-in-part of U.S. patent application Ser. No. 09/599,979, filed Jun. 22, 2000 by Kenneth Schofield et al. for VEHICLE RAIN SENSOR USING IMAGING SENSOR, now U.S. Pat. No. 6,320,176, which is a continuation of U.S. patent application Ser. No. 09/135,565, filed on Aug. 17, 1998 for VEHICLE HEADLAMP CONTROL USING IMAGING SENSOR, now U.S. Pat. No. 6,097,023; and a continuation-in-part of U.S. patent application Ser. No. 09/776,625, filed Feb. 5, 2001 by Kenneth Schofield et al. for VEHICLE CAMERA DISPLAY SYSTEM, now U.S. Pat. No. 6,611,202, which is a continuation of U.S. patent application Ser. No. 09/313,139, filed May 17,1999 for REARVIEW VISION SYSTEM WITH INDICIA OF BACKUP TRAVEL, now U.S. Pat. No. 6,222,447, which is a continuation of U.S. patent application Ser. No. 08/935,336, filed Sep. 22, 1997 for DISPLAY ENHANCEMENTS FOR VEHICLE VISION SYSTEM, now U.S. Pat. No. 5,949,331; and a continuation-in-part of U.S. patent application Ser. No. 09/530,306, filed Apr. 27, 2000 by Kenneth Schofield et al. for RAIN SENSOR WITH FOG DISCRIMINATION, now U.S. Pat No. 6,353,392, which is a 371 national phase application of International PCT Application No. PCT/US98/23062, filed Oct. 30, 1998, which claims priority on U.S. provisional application, Ser. No. 60/064,335, filed Oct. 30, 1997, which are all hereby incorporated in their entireties.

BACKGROUND OF THE INVENTION

This invention relates generally to vehicle moisture detection systems which detect precipitation on an outer surface of a vehicle window or windshield and, more particularly, to a rain detector which is decoupled from the windshield and capable of detecting rain on an exterior surface of the window.

Several rain sensor systems have been proposed to date. Early systems were typically closely coupled to the interior surface of the windshield, such as by bonding to the glass surface or the like. By positioning the system immediately adjacent to the window, the rain sensor units sampled a relatively small area on the window. However, even the small sampling area may include many scratches, pits or other surface irregularities on the window which may dominate the signal received by the rain sensor system, thereby leading to an erroneous detection of rain on the window when little or no rain is actually present. Furthermore, in order to achieve an adequate sampling area, a greater number of sampling channels is required, which results in an increase of cost and bulk to the units. An additional concern with closely coupled units is that they create difficulties in the vehicle assembly plants, since it is then necessary to handle two different windshield configurations in the factory, which increases inventory costs. The close coupling also creates difficulties in the replacement of the windshield in the after market, since the rain sensor unit has to be replaced along with the windshield if the windshield is damaged.

Other rain sensor devices have been proposed that are decoupled from the windshield such that the sensors are spaced from the interior surface of the windshield, in order to avoid concerns with replacing the windshield and other deficiencies present with the coupled systems. However, by spacing the rain sensor from the interior of the surface of the window, the rain sensor receives data from a larger sampling area on the window. This further increases the likelihood of significant errors in detecting rain droplets on the exterior of the windshield and discerning them from scratches or other surface irregularities which may be present on the window. This is a greater concern when the rain sensor is operable on a windshield of a vehicle, since the exterior surface of a windshield is typically scratched and/or nicked in multiple places due to debris impacting the windshield as the vehicle is driven. Because the number of surface irregularities may be significantly greater than the amount of precipitation that may be present on the window, the rain sensor systems may result in erroneous detection of rain droplets when there is little or no precipitation present on the window.

Other systems have recently been proposed which include an illumination source and an illumination sensor at an acute angle relative to one another, such that when the light from the illumination source is refracted through the windshield and further reflected by water droplets on the exterior surface of the windshield, the light may be received by the illumination sensor and processed to determine if precipitation is present on the exterior surface of the windshield. However, the addition of an illumination source further intensifies the appearance of the surface irregularities which may be present on the window, since the light reflects and scatters from the pits or scratches back toward the sensor, such that there is a greater likelihood that the surface irregularities will dominate the signal received by the illumination sensor. This again may result in an erroneous detection of precipitation when there is little or no rain present on the window, since none of these systems account for any surface irregularities, such as scratches or pits or the like, on the exterior and/or interior surfaces of the window.

SUMMARY OF THE INVENTION

The present invention is intended to provide a vehicular rain sensor which accurately detects rain on a vehicle window under a wide variety of operating conditions, including when fog is present on the windshield interior, and provides the ability to separately detect the presence of rain or fog on a window of a vehicle.

According to one aspect of the present invention, a rain sensor which senses precipitation at a vehicle window comprises an imaging array sensor directed toward a vehicle window for detecting precipitation at the window and a control which is responsive to the imaging array sensor detecting precipitation at the window. The control includes a filtering process. One function of the filtering process is to reduce the affect on the rain sensor of irregularities of the vehicle window, particularly surface irregularities of the window.

According to another aspect of the invention, the control may include a computer programmed with an edge detection algorithm, for detecting the edges of droplets of rain as they appear on the exterior surface of the windshield. The control may be coupled to a windshield wiper such that the wipers are turned on when a predetermined threshold value of precipitation is detected on the window. An illumination source may also be implemented for illuminating the window when ambient light levels are low. Preferably, the filtering process is operable to correct for signals due to surface irregularities when the illumination source is activated.

In one form, an optic may be included between the imaging array sensor and the windshield. The optic has a low f-ratio which provides a narrow depth of field to the imaging array sensor, such that only the area immediately adjacent the windshield is in focus on the imaging array sensor. The imaging array sensor and optic are oriented relative the windshield to satisfy the Scheimpflug condition such that the optic focuses an entire sampling area of the windshield onto the correspondingly angled imaging array sensor.

In another form, the vehicle rain sensor includes a polarizing filter that is at least occasionally positioned in an optical path between the illumination source and the sensor to filter out polarized light radiated from a fog particle on the inside of the window. The control responds to a signal from the sensor in order to indicate precipitation on an exterior surface of the window independent of moisture on an interior surface of the window.

According to still yet another aspect of the present invention, a vehicle rain sensor for detecting rain or fog on a vehicle window comprises at least one illumination source and at least one imaging sensor, defining at least one optic path therebetween. At least one of the optic paths is defined between at least one of the illumination sources and the vehicle window, and between the vehicle window and at least one of the imaging sensors. A polarizing filter is positioned along at least one of the optic paths, and a control responds to an output of at least one of the illumination sensors in order to indicate precipitation on an exterior surface of the window or fog on an interior surface of the window. The control includes a filtering process to account for irregularities such as surface irregularities of the vehicle window.

In one form, the control may communicate with the vehicle windshield wipers and/or the rear window wipers when rain is detected on the exterior surface of the window and communicate with a blower within the vehicle to activate the blower when fog is detected on the interior surface of the window.

According to another aspect of the present invention, a vehicular sensor is adaptable for receiving a signal through a vehicle window. The vehicular sensor comprises an imaging sensor directed at the window from inside the vehicle and a control. The control includes a filtering process to adjust an output of the imaging sensor in response to a plurality of signals in the output which are associated with surface irregularities on the vehicle window. The control then responds to an adjusted output of the imaging sensor.

The invention provides a new principle of detection which is decoupled from the windshield and may accurately detect the presence of rain on the windshield and distinguish rain from other phenomena which could be confused with rain, such as fog or surface irregularities associated with the window. The invention further optimizes rain sensing by filtering the signal from the sensor to account for the surface irregularities on the window, thereby substantially precluding the likelihood of a false rain detection by the sensor. The invention may also accurately provide for the separate detection of fog, thereby allowing further measures to be taken to improve driver visibility.

These and other objects, advantages, purposes and features of this invention will become apparent upon review of the following specification in conjunction with the drawings.

BRIEF DESCRIPTION OF THE DRAWINGS

FIG. 3a–c are graphical illustrations of the geometric relationship of the elements of FIG. 1 in three dimensions;

FIG. 4 is a block diagram of an electronic control circuit;

FIG. 9 is a perspective view of another alternate embodiment of a rain sensor with fog discrimination in the direction of the window interior surface;

FIG. 10a–c are side elevations of the embodiment illustration in FIG. 9 illustrating operation thereof under different conditions;

FIG. 11 is the same view as FIG. 9 of another alternate embodiment thereof;

FIG. 12 is the same view as FIG. 9 of yet another alternate embodiment thereof;

FIG. 13 is the same view as FIG. 4 of another alternate embodiment thereof;

DESCRIPTION OF THE PREFERRED EMBODIMENTS

Figure 1:
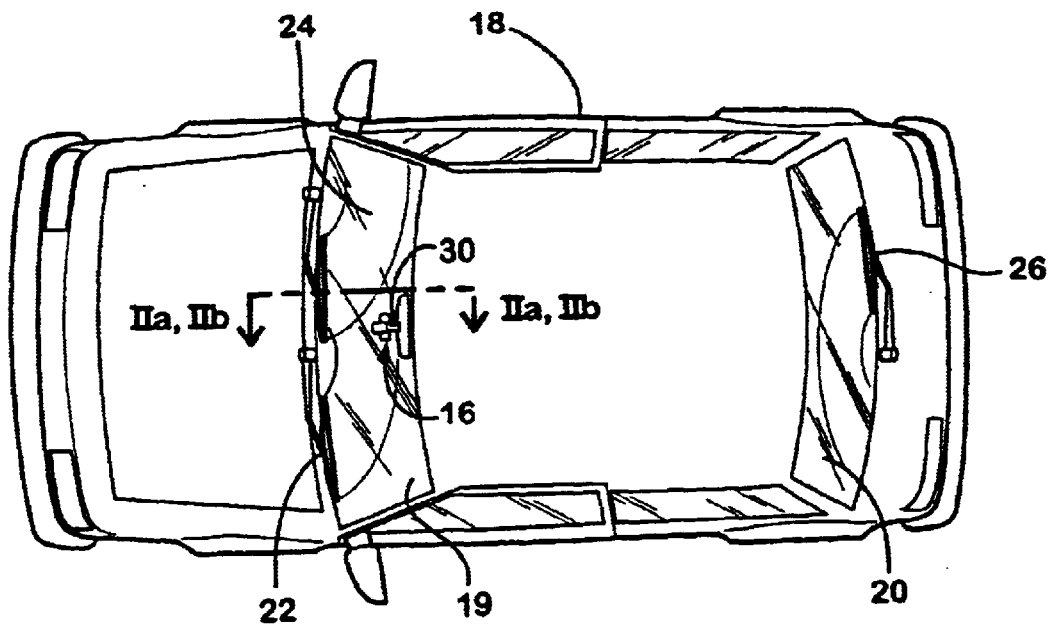
FIG. 1 is a top view of a vehicle with a rain sensor with fog discrimination according to the present invention installed therein.
Figure 2A:
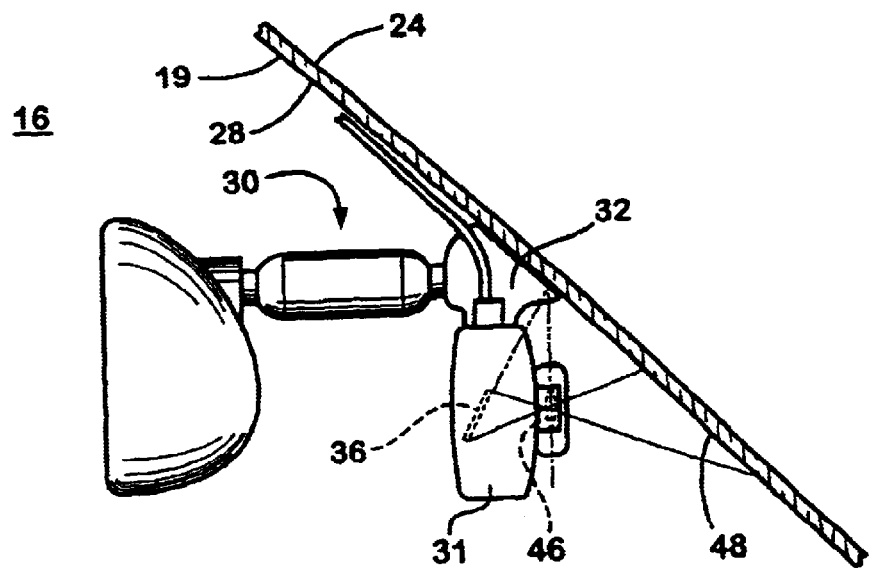
FIG. 2a is a sectional view taken along line II—II in FIG. 1.

Referring now specifically to the drawings and the illustrative embodiments depicted therein, a vehicle rain sensor system, generally illustrated at 16, is positioned inside a vehicle 18 and directed toward a sampling area 48 of a window 19, which is illustrated as a windshield of vehicle 18 also having a rear window 20 (FIG. 1). Vehicle 18 may be automobile, a light truck, a van, a large truck, a sport utility vehicle or the like. Vehicle 18 further includes windshield wipers 22 for wiping precipitation from an exterior surface 24 of window 19 and may also include a rear window wiper 26 for clearing rear window 20 of precipitation as it accumulates thereon. Rain sensor system 16 is conveniently incorporated in a rear view mirror assembly 30 attached to an interior surface 28 of front window, or to the roof above the front window, by a mounting bracket 32, which is typically secured or bonded to interior surface 28 of window 19 by adhesive or the like (FIG. 2). Rain sensor 16 is preferably mounted within a pod 31 suspended from bracket 32 such that rain sensor system 16 is spaced from, or decoupled from, interior surface 28 of window 19. Such a pod 31 may of the type disclosed in commonly assigned U.S. Pat. Nos. 5,576,687 and 5,708,410 issued to Blank et al., the disclosures of which are hereby incorporated herein by reference.

Rain sensor system 16 of the present invention includes an illumination sensor or detector 36, which is preferably a multi-element, electro-optic, pixelated imaging array sensor, such as a CMOS imaging array, CCD imaging array sensor or the like, a detailed description of which is disclosed in commonly assigned U.S. Pat. No. 5,670,935, issued to Schofield et al., patent application, Ser. No. 09/313,139, filed on May 17, 1999, now U.S. Pat. No. 6,222,447, which is a continuation of application Ser. Number 08/935,336, filed on Sep. 22, 1997, now U.S. Pat. No. 5,949,331, which is a continuation of the Schofield '935 patent, the disclosures of which are hereby incorporated herein by reference.

Rain sensor 16 preferably includes a smoothing algorithm or filter 35 which processes data sampled by illumination detector 36 in order to account for irregularities of the 7 window. Such irregularities are predominately surface irregularities such as pits and/or scratches, which may be present in sampling area 48. Other irregularities may include internal irregularities such as antenna and other insets in the glass, as well as lamination defects and the like. By mounting rain sensor system 16 in a rear view mirror bracket such that illumination detector 36 is directed toward the front of the vehicle, rain sensor system 16 may be adapted to also operate as a head lamp controller, as disclosed in commonly assigned U.S. Pat. No. 5,796,094 issued to Schofield et al., and patent application, Ser. No. 09/135,565, filed Aug. 17, 1998, now U.S. Pat. No. 6,097,023, which is a continuation of the Schofield '094 patent, the disclosures of which are hereby incorporated herein by reference. Furthermore, illumination detector 36 may be adapted to function as a component of an active cruise control system, whereby the detector functions to determine the speed at which the vehicle is travelling. Alternatively, if the rain sensor system disclosed herein were mounted such that illumination detector 36 were facing rearward, toward rear window 20 of vehicle 18, illumination detector 36 may be adapted to function as a component of a vehicle back-up aid system. It is further envisioned that the smoothing algorithm of the present invention may be applied to other vehicular vision or control systems, such as a wide angle image capture system of the type disclosed in commonly assigned United States Patent application, Ser. No. 09/199,907, filed on Nov. 25, 1998 by Brent J. Bos et al., or a vision system of types disclosed in above referenced U.S. Pat No. 5,670,935 and in commonly assigned U.S. Pat. No. 5,550,677, issued to Schofield et al., the disclosures of which are hereby incorporated herein b reference Illumination detector 36 is preferably a multi-element imaging array mounted behind an optic lens 46 that is positioned between detector 36 and windshield 19. Lens 46 is preferably designed to have a small f-ratio in a range between approximately 0.8 and approximately 1.1, and a long focal length, preferably as long as possible while still encompassing sampling area 48. This provides a narrow depth of field of the image, which results in detector 36 receiving a focused image of only the area immediately forward and rearward of window 19. Imaging array detector 36, lens 46 and window 19 are all oriented relative one another according to the Scheimpflug relationship, which results in scenic information of sampling area 48 on window 19 being in focus on detector 36, not withstanding the small f-ratio and long focal length of the optic. This relationship is commonly known in the field of optical engineering and is illustrated in FIGS. 3*a*–*c* by a plane 49 passing through lens 46 and a plane, shown by dashed line 50, extending along detector 36, both of which intersect a plane defined by window 19 at a line 52 (FIG. 3*c*). This relationship applies three dimensionally, with plane 49 passing through lens 46 and plane 50 extending along detector 36 intersecting the plane defined by window 19 at the same line 53 (FIG. 3*b*). By orienting detector 36, lens 46 and window 19 in such a fashion, the entire angled surface of sampling area 48 on window 19 will be brought into focus on the angled surface of detector 36.

As shown in FIG. 4, rain sensor 16 includes an electronic control 40 having an A/D converter 37 which converts the analog information captured by imaging array 36 into digital format for use in processing by filtering process 35 and an edge detection function 44. If the edge detection function detects the presence of precipitation, such as rain droplets, a windshield wiper control 21 may activate the windshield wipers 22 and/or modulate the wiper speed in proportion to the quantity of droplets detected. Although precipitation is disclosed herein primarily in reference to rain, it is intended to further include other water, such as snow melt, snow fall, road splash and other forms of moisture accumulation or deposition. Control 40 further includes a detection control function 42 which coordinates operation of the various components of control 40 so that individual capture frames of array 36 are grabbed and processed. Preferably, the functions of control 40 are integrated in a programmed computer or micro-computer, but may be individually provided as discreet analog or digital components. If array 36 includes interface circuitry capable of producing digital signals, the need for A/D converter 37 may be obviated. By the terms control and/or computer as used herein, it is envisioned that the present invention may include a microcomputer with an embedded control application, a custom digital logic circuit, a digital signal processor circuit or the like, which may be adaptable to be positioned within or in the vicinity of a rear view mirror housing.

Although edge detection function 44 detects the edges of rain droplets present on the window 19, other marks on window 19 associated with various irregularities, such as pits, scratches and/or defects of window 19, or accessories on or within window 19, may also be detected by edge detection function 44. Typically, the edges of raindrops at window 19 may be less than ten millimeters across and more typically, less than five millimeters across their diameters, although many raindrops may be larger or smaller. However, most pits, scratches and/or defects of window 19 are typically less than two millimeters in size. Although these marks are typically smaller than the rain droplets, edge detection function 44 may not be able to discern the droplets from the other marks. Because the exterior surface 24 window 19 may become highly scratched or pitted within a short period of time, the irregularities as detected by edge detection function 44 may dominate over the number of precipitation droplets present at exterior surface 24, thereby resulting in an erroneous determination that the number of rain droplets detected is above the predetermined threshold value. Therefore, control 40 includes a digital filter or smoothing algorithm 35 in order to account for the surface irregularities on window 19 and thus reduce or substantially preclude the likelihood of an erroneous determination of rain on window 19 when there is little or no precipitation thereon.

Smoothing algorithm 35 is preferably a local filter which smoothes the data received by the pixilated imaging array 36 by changing the value of an individual pixel based on information received from neighboring pixels. This process is reiterated for each individual pixel within sampling area 48. The neighboring pixels may be immediately adjacent to or surrounding the individual pixel or may be within a predetermined range of pixels remote from the individual pixel. The selection of the size and shape of a group or window or sub-array of pixels may vary based on the particular application of the rain sensor. Many such smoothing algorithms are known in the art of computer graphics and the like, such as those used for removing random electronic noise from remote sensing images. Preferably, smoothing algorithm 35 of control 40 is a Median filter, Sigma filter or Nagao-Matsuyama filter, or some modification of one or more of these filters such that smoothing algorithm 35 is optimized for the particular sensor application. However, many other digital filtering processes are known and are available and a skilled artisan would select an appropriate or optimal algorithm for the particular application of the present invention.

Because the irregularities, pits and/or scratches of a window are typically very small, smoothing algorithm 35 may filter out or adjust data associated with these small detected items, without significantly changing the data values associated with the relatively large rain droplets and/or fog particles which may also be present on window 19. Smoothing algorithm 35 is preferably a local filter in that it modifies a value of each individual pixel based on information received from other pixels surrounding or neighboring the individual pixel to be adjusted. For example, a Median filter may utilize a 3×3 or 5×5 group or window of pixels and sets, or adjusts, the center pixel value in response to a calculated average of the values of the other pixels within the corresponding window. This averaging and resetting of pixels is performed for each individual pixel of the imaging array sensor. This filtering process thus removes or adjusts individual pixel values associated with small pits or scratches, without removing or significantly changing pixel values associated with the larger contiguous edges of precipitation present on the window. This is possible because within each small window, the pixel values associated with the smaller pits and scratches will not dominate the window or the other pixel values associated with a "clean" area of window 19. The pixel values associated with the pits or scratches are therefore reduced or filtered out by the smoothing algorithm. The larger, contiguous edges of the rain droplets, on the other hand, would not be significantly altered because these edges span more than one or two pixels, such that an average window would contain several pixels associated with the edges of the droplet.

The size and shape of the sampling window associated with this filtering process may be modified according to the particular application. If the irregularities making up the "bad" image portions of the array are only one to two pixels in size, then a small 3×3 pixel window should substantially preclude erroneous determinations by edge detection function 44. On the other hand, if the pits and/or scratches are larger, then a larger window may be preferred. However, it is most preferable to implement as small a window as possible in order to minimize the effect on the pixel values associated with rain droplet edges and thus the effect on the number of actual rain droplet edges detected by edge detection function 44.

Another known filter useful with the present invention is the Sigma filter, which functions similarly to the Median filter discussed above. However, the Sigma filter averages the values of only those pixels within the window that are within a certain threshold limit of the center pixel value. Typically, this threshold limit is determined by plus or minus $2\sigma$ from the center value, where $\sigma$ is an assumed or estimated standard deviation of the irregularities or "bad" pixel values associated with the sampling area 48 on window 19. The center pixel value for each window is then set to be the calculated average of the pixels that are within the predetermined threshold for the corresponding window. This process is reiterated for each pixel within the sampling area 48 on window 19.

Another known filter useful with the present invention is the Nagao-Matsuyama filter, which rotates a group or window of pixels about each particular pixel in sampling area 48 in order to determine the most homogenous neighborhood area around each pixel. At each point of rotation, both the mean and the variance of the pixel values within the window are calculated. A window of lowest variance may then be determined by comparing the values at each point of rotation. The value of the target pixel, or the individual pixel around which the associated window is rotated, is then adjusted or reset to the mean value of the pixels within the lowest variance window. This process is reiterated for each pixel within sampling area 48. This filtering process may be optimized for a particular application by changing the shape and/or the size of the rotating window in order to better reject a particular type of bad pixels which may be expected in the particular application, while still preserving the edges associated with actual rain droplets on window 19.

After smoothing algorithm 35 has been performed on data received by sensor 36, edge detection function, shown generally at 44 in FIG. 4, analyzes the signal from illumination detector 36 and determines the number of precipitation droplets present on exterior surface 24 by detecting the edge of each droplet and further determining if the number of edges detected is above a predetermined threshold value. Edge detection function 44 allows imaging array detector 36 to interrogate many complex patterns on a surface of window 19, instead of integrating them together and thereby diluting the impact of the effects. The edge detection function isolates and identifies the individual phenomenon that become present on exterior surface 24 of window 19, which allows the system to separate out the multiple effects of the phenomena, rather than integrating them together. Such an edge detection algorithm is commercially available and is marketed by MathWorks as a MATLAB image processing toolbox EDGE routine. Alternately, an edge detection/thresholding algorithm may be used that uses the Roberts, Prewitt, or Sobel approximation to the derivative, which are generally known in the art. While these algorithms are available and have been used to test and evaluate the present invention, it is important to note that many edge detection algorithms are commercially available and a skilled artisan would select the appropriate algorithm for each application of the present invention. For example, an edge detection algorithm may analyze precipitation droplets in a linear manner, where the algorithm enhances the edges as received by the imaging array detector and counts the contiguous droplets present within the sampling area. Alternatively, an edge detection algorithm may enhance and then further analyze the droplets according to the number of droplets and the size of their contiguous edges or other characteristics. Therefore, by implementing an imaging array sensor for illumination detector 36 and further utilizing a filtering process 35 and an edge detection algorithm 44, the effects of fog or fogging on the interior surface 28 of window 19, and of other interferences, may be significantly reduced as the rain sensor actually receives and analyzes the contiguous droplet edges present within an image of sampling area 48 on window 19, rather than merely receiving a pulse of light reflecting or emitting from an object on window 19.

Control 40 may be used to control windshield wipers 22 on front window 19 and may further be used to control rear window wipers 26 on rear window 20 of the vehicle 18. Control 40 may activate rear wiper 26 at the same or different rate as front wipers 22. For example, for every N wipes of front wiper 32, control 40 may generate a command for rear wiper 26 to wipe one time. N is preferably some number greater than 1 so that rear wiper 26 does not wipe as often as front wiper 22. Control 40 may further vary the rate of rear wiper 26 based on the wipe rate of front wipers 22, which may also be varied depending on the level of precipitation detected on exterior surface 24 of window 19. Furthermore, the edge detection function may provide various thresholds at which control 40 activates the wipers at different speeds. For example, when the size and/or number of contiguous edges is low, the wipers may be activated for only a single wipe across the windshield or rear window, whereas when the size and/or number of the contiguous edges increases, a continuous low speed wipe may be provided or even a continuous high speed wipe as the size and/or number of contiguous edges detected further increases.

Figure 2B:
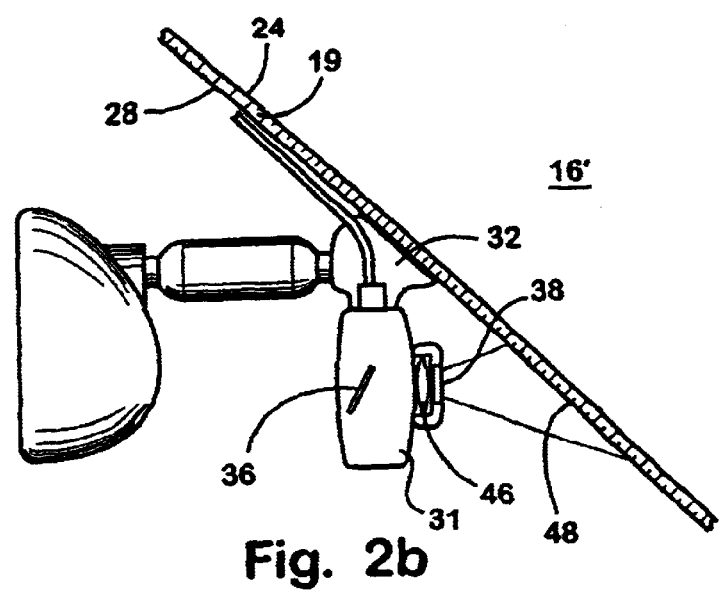
FIG. 2b is the same view as FIG. 2a of an alternate embodiment of the present invention.

In an alternate embodiment of a vehicle rain sensor system 16', illustrated in FIG. 2b, an illumination source 38 is also positioned within pod 31 to provide illumination to sampling area 48 of window 19. This allows illumination detector 36 to operate in low ambient light conditions by illuminating raindrops present on the window. When precipitation or fog is present at window 19, illumination emitting from illumination source 38 is reflected and refracted by the window and the precipitation droplets such that illumination is received by illumination detector 36. However, when neither fog nor rain is present at window 19, illumination detector 36 does not directly receive any substantial amount of light emitting from illumination source 38, as light emitting from illumination source 38 reflects downward from interior surface 28 of window 19 or refracts through window 19, rather than reflecting toward illumination detector 36.

While illumination source 38 enhances the ability of the rain sensor to detect precipitation on window 19, this also intensifies images received by illumination detector 36 which are associated with irregularities of window 19. When the rain sensor is operable in ambient light conditions, such irregularities are typically barely visible due to their small size and thus are not as readily detectable by edge detection algorithm 44. However, when the rain sensor is operable with illumination source 38, the illumination from illumination source 38 reflects and scatters from these irregularities back toward illumination detector 36, such that the signals received by detector 36 are more difficult to discern between those associated with a rain droplet or with a scratch on window 19. Accordingly, the rain sensor most preferably includes a smoothing algorithm 35 which is operable when illumination source 38 is also activated. As discussed above, however, smoothing algorithm 35 may also be operable when no illumination source is activated. In order to further optimize rain detection in both lighting conditions, smoothing algorithm 35 may function in one manner when illumination source 38 is activated while operating in another manner when illumination source 38 is deactivated. This may be accomplished by changing the size or shape of the window or by changing the threshold criteria within each smoothing algorithm.

Illumination source 38 may be a standard photodiode, infrared energy emitter or the like, and is preferably operable in a pulse mode. Most preferably, rain sensor 16' is coordinated such that illumination source 38 is pulsed to illuminate the area on the window while illumination detector is simultaneously exposed to the area. Illumination detector 36 may be either mechanically or electronically shuttered open at the precise moment that illumination source 38 is pulsed or activated. This results in a more efficient system by avoiding the operation of illumination source 38 except for those moments when illumination sensor 36 is actually receiving an image. This also allows a high peak illumination, as provided by illumination source 38, to be more readily extracted from the background ambient lighting. Because an imaging array sensor may process either visible light or invisible, infrared ranges, illumination source 38 of the present invention may provide illumination at a preferred wavelength which is between the visible ranges and infrared ranges. Therefore, illumination source 38 is preferably a LED which emits energy pulses having a wavelength near that of infrared light, such that the beam emitted is substantially invisible to the human eye, yet may still pass through the infrared filter characteristics within certain vehicle's windows. Most preferably, the energy emitted by illumination source 38 has a wavelength within the range of approximately 820 to 880 nanometers, which may be transmitted through the filtering characteristics of a window and processed by imaging array sensor 36.

Figure 6:
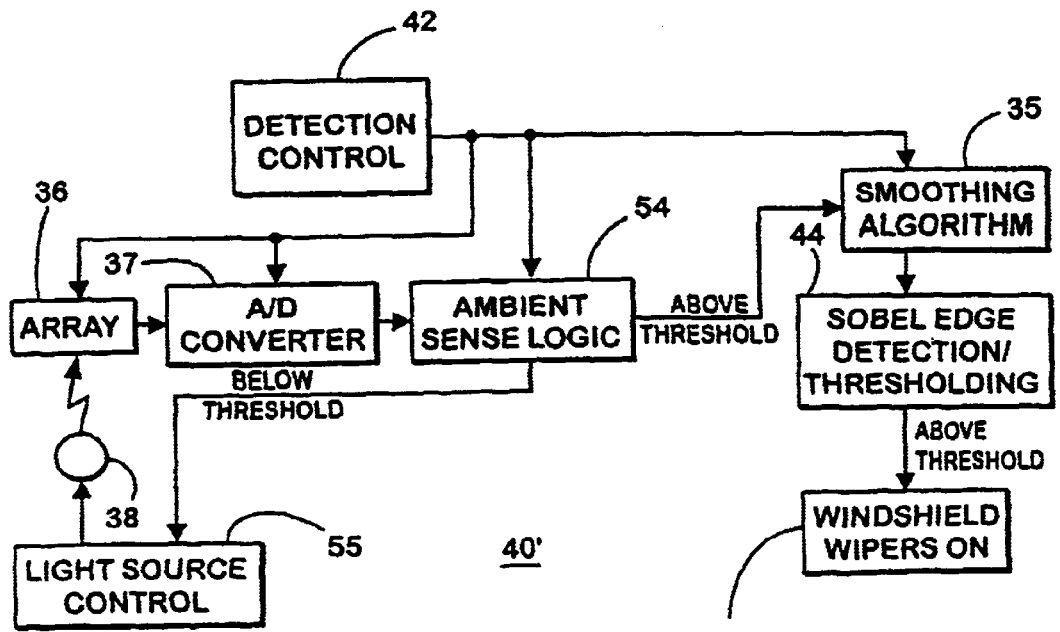
FIG. 6 is the same view as FIG. 4 of an alternate embodiment thereof.

A control 40' useful with rain sensor system 16' includes an ambient light logic function 54 to determine the level of ambient light present on window 19 and switch rain sensor system 16' between a passive mode, where illumination source 38 is not used, when light present on window 19 is provided by ambient light, and an active mode, where illumination source 38 is activated by an illumination source control 55, and patterns are illuminated on windshield 19 by illumination source 38 and received by imaging array 36 (FIG. 6). Preferably, illumination source control 55 activates illumination source 38 when the illumination level detected by ambient light logic function 54 is below a threshold value of approximately 250 lux. More preferably, the active mode is triggered when the illumination level detected is below approximately 150 lux, and most preferably, when the illumination level detected is below approximately 100 lux. Alternatively, illumination source control 55 may activate illumination source 38 in response to a signal from a head lamp controller to activate the headlights of the vehicle, or in response to the headlights being otherwise activated. Control 40' may activate smoothing algorithm 35 only when illumination source 38 is activated or may activate smoothing algorithm 35 each time an image is received by illumination detector 36. Control 40' may also activate a different version of smoothing algorithm 35 in response to activation or deactivation of illumination source 38.

Most preferably, ambient light logic function 54 is responsive to the output of A/D converter 37 to determine ambient conditions from a light level sensed by imaging array sensor 36. More particularly, present ambient light conditions may be determined by summing the signal values received by each pixel within the imaging array sensor. When the sum of the values is above a predetermined threshold value, rain sensor system 16' operates in its passive mode and edge detection algorithm 44 analyzes the image as discussed above, while if the sum is below the predetermined threshold value, rain sensor system 16' instead operates in its active mode where ambient logic function 54 causes illumination source control 55 to activate illumination source 38. When in the active mode, illumination source 38 may be turned on in a pulse mode, so that illumination detector 36 receives several images to extract the signal from any noise that may be present. Preferably, smoothing algorithm 35 is activated when rain sensor 16' is operating in the active mode in order to minimize the effect of scratches and the like which may be present on or within window 19. Once the noise has been removed from the signal, and erroneous values have been accounted for by algorithm 35, control function 42 determines if the level of precipitation, if any, is above a predetermined threshold value. If rain is detected, wiper control 21 activates front wipers 22, and may also operate rear wiper 26, as necessary.

Figure 5A:
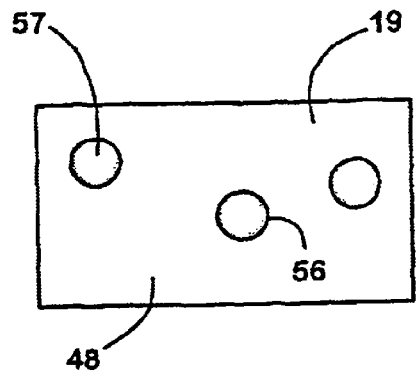
FIG. 5a is an enlarged illustration of the optical features of rain droplets which are detected by an edge detection algorithm during daytime conditions.
Figure 5B:
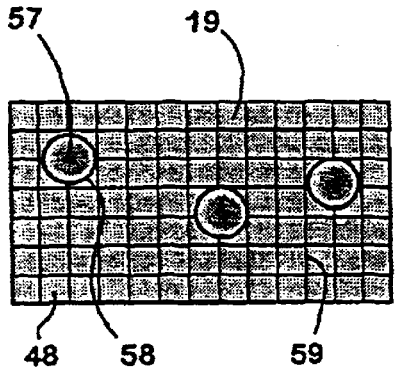
FIG. 5b is the same view as FIG. 5a during nighttime conditions.

Typical raindrops, as received by an imaging array sensor, are represented at 57 in FIGS. 5a and 5b. FIG. 5a shows an image of rain drops 57 on windshield 19 during daytime light conditions, when the system 16' may be in a passive mode. FIG. 5b shows images of typical raindrops 57 on window 19 when the system 16' is in an active mode at night lighting conditions. This is shown on a "clean" window which has no scratches or pits on its surfaces. When precipitation droplets 57, such as from rain, dew or the like, are present on exterior surface 24 of window 19 in area 48 during the daytime, the light received by illumination detector 36 includes dark rings 56, which correspond to the edges of the precipitation droplets 57 present on window 19, as best shown in FIG. 5a. Conversely, when rain sensor 16' is in an active mode at nighttime, the edges of precipitation droplets 57 form images of light rings 58 on a dark background 59, as shown in FIG. 5b.

Figure 15:
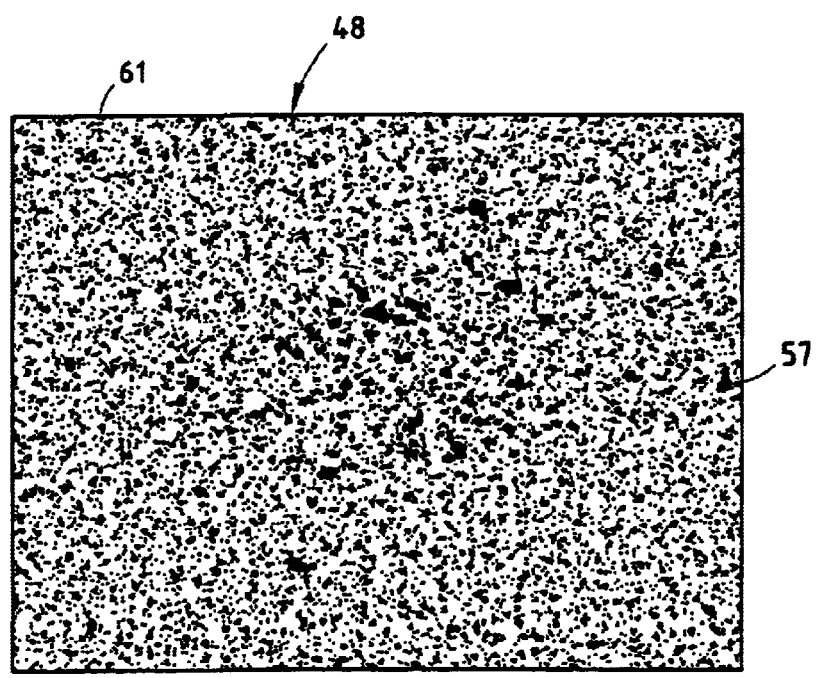
FIG. 15 is the rain droplet simulation of FIG. 14, with simulated scratches and pits included on the window.

Although edge detection function 44 detects and calculates the number of edges 56 and 58 of precipitation droplets 57, window 19 will typically include many other marks associated with scratches, pits, defects or the like and detected by imaging array sensor 36. Referring now to FIGS. 14 to 18, a simulation is shown of a typical sampling area as detected by sensor 36 when illumination source 38 is activated. As discussed above, rain droplets 57 appear as light rings on a dark background. The rain droplets 57 are simulated in FIGS. 14–18 as dark rings or dots on a light or white background. However, as shown in FIG. 15, a typical sampling area 48 provides images associated with the precipitation droplets 57 along with a high number of other signals, typically associated with irregularities of window 19, such as pits or scratches on the window surface, which are represented by the smaller dots 61. Without any smoothing algorithm or filter process, edge detection function 44 would count each signal received as a rain droplet, thereby resulting in a substantial error in the number of droplets on window 19 determined by edge detection function 44. For example, the simulated sampling area of FIG. 15 results in a count of approximately 10,000 edges or droplets, when an accurate count of only the rain droplet edges (FIG. 14) should have resulted in a count of only approximately 2500 edges.

Figure 16:
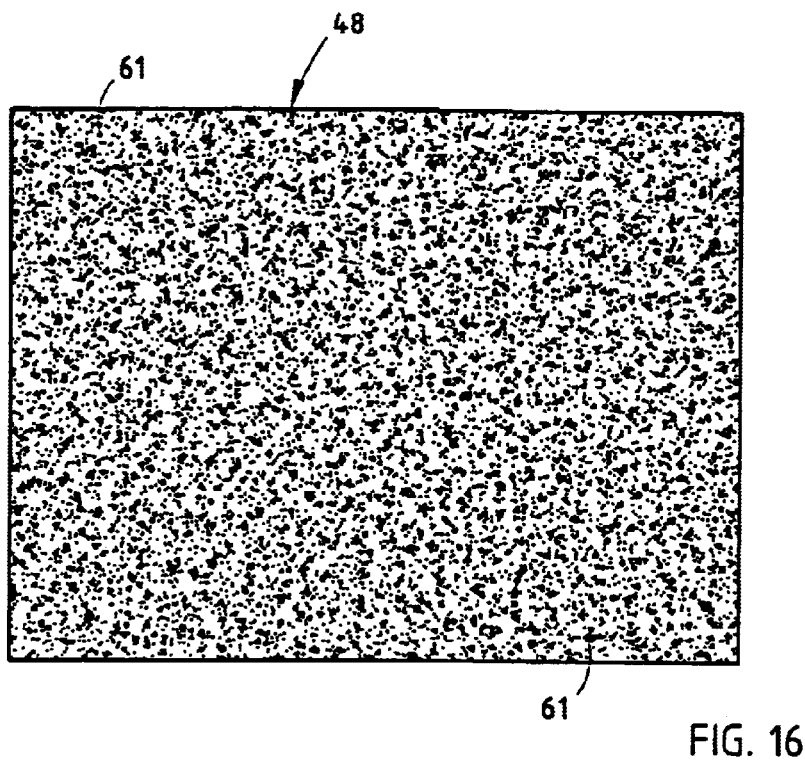
FIG. 16 is a simulated representation of the scratches and pits shown in FIG. 15.
Figure 17:
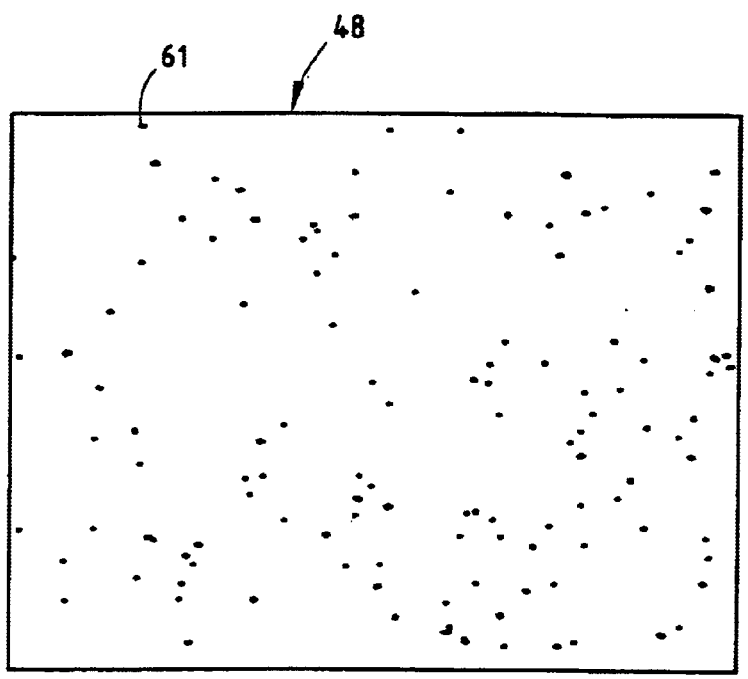
FIG. 17 is a simulation of the scratches and pits of FIG. 16, after a smoothing algorithm has been performed on the data.
Figure 18:
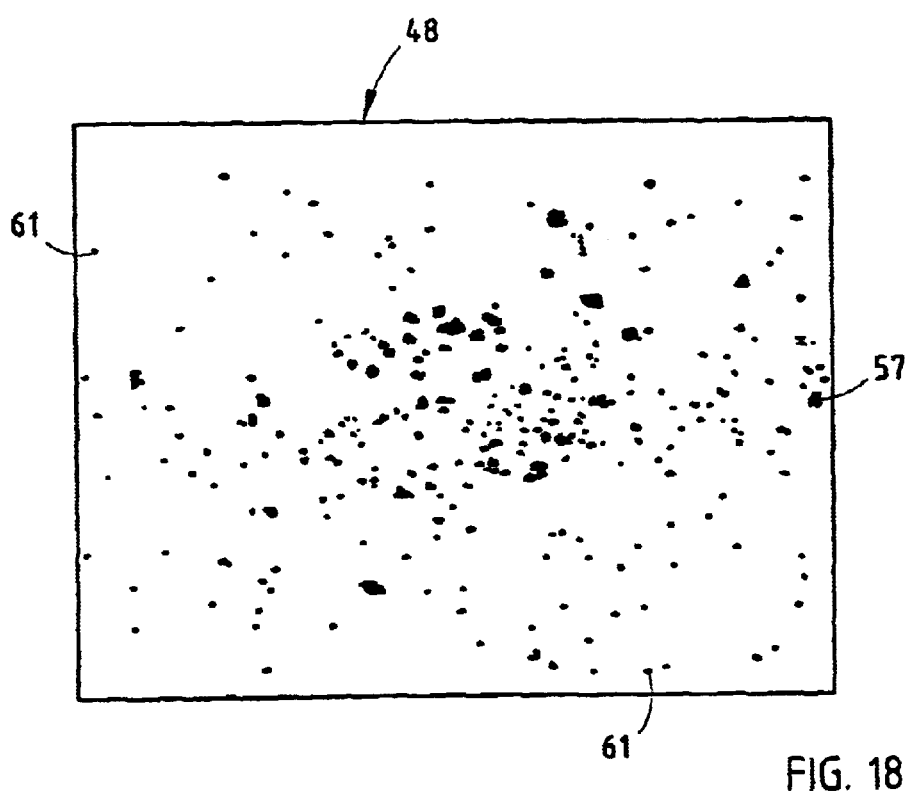
FIG. 18 is a simulation similar to that of FIG. 15, after the smoothing algorithm has been performed on the data collected.

The effects of smoothing algorithm 35 are best shown in reference to FIGS. 16 to 18. When no rain is present on window 19, imaging array sensor 36 detects surface irregularities as simulated in FIG. 16. As mentioned above, this figure is a simulation of the scratches and pits which may occur to a vehicle window 19 over time, due to debris and the like impacting the exterior surface 24 of window 19 as the vehicle is driven. The number of irregularities thus vary across the surface of the window and may further vary over time as additional pits, scratches and the like may later occur. By activating smoothing algorithm 35, many of the irregularities may be filtered and/or averaged out of the data received by sensor 36, such that edge detection function 44 analyzes and counts a substantially fewer number of pits as edges of rain drops. The simulation of FIG. 16 is shown again in FIG. 17 after smoothing algorithm 35 has been performed, resulting in a substantially "cleaner" sampling area 48 on window 19. In testing smoothing algorithm 35 on this simulation, the number of pits detected was reduced from approximately 9200 (FIG. 16) to less than 500 (FIG. 17), after smoothing algorithm 35 was performed.

Referring now to FIG. 18, data associated with rain droplets and irregularities of sampling area 48 and received by sensor 36 is shown after smoothing algorithm 35 has been applied. The pixel values have been adjusted such that the number of pits 61 detected has been substantially reduced by smoothing algorithm 35 as compared to the initial unfiltered sample shown in FIG. 15, while the edges of the droplets 57 have not been greatly affected. Testing has shown that the error associated with the unfiltered sample may be reduced from approximately 300% (FIG. 15) to less than only 2% (FIG. 18) by implementing digital filter or smoothing algorithm 35. As seen in FIG. 18, rain droplet edges can then be accurately detected and counted by edge detection function 44, since the number of edges representing rain droplets dominates over the remaining images representing surface irregularities on window 19.

The edge detection function 44 in control 40' functions to detect and analyze the droplets 57 and further determines a density of raindrops on area 48 of window 19. In either day or night conditions, the same edge detection algorithm may be applied to detect the edges and count the number of rain drops present on window 19, and compare that amount to a predetermined threshold value. Most preferably, smoothing algorithm 35 is operable when rain sensor 16' is in its active mode, since this mode substantially increases the error associated with irregularities of window 19. However, smoothing algorithm 35 may also be operable when the rain sensor is in its passive mode. Once the number of droplets 57 that are detected is above a predetermined threshold value, control 40' operates to activate windshield wipers 22, including modulating the wiper speed as a function of the sensed raindrop density. Preferably, the threshold value may be changed as the level of ambient light changes, since the driver of a vehicle becomes more sensitive to raindrops on the windshield as ambient conditions get darker. Therefore, the edge detection algorithm may have a lower threshold value during night-time conditions than during daytime conditions. The threshold value may change as rain sensor system 16' is switched between its active and passive modes.

Figure 7:
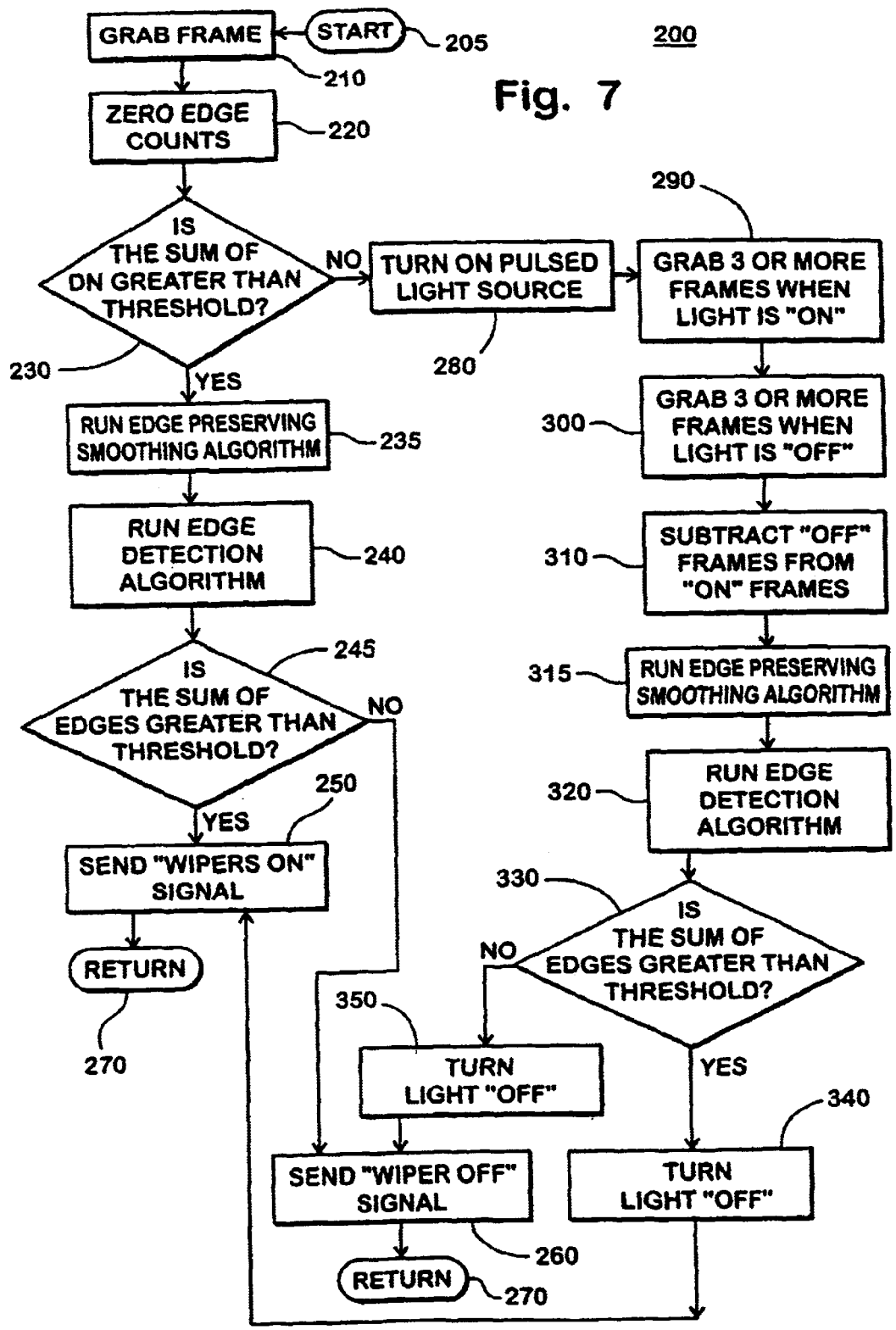
FIG. 7 is a flow chart of an edge detection process performed by the control circuit shown in FIG. 6.
Figure 14:
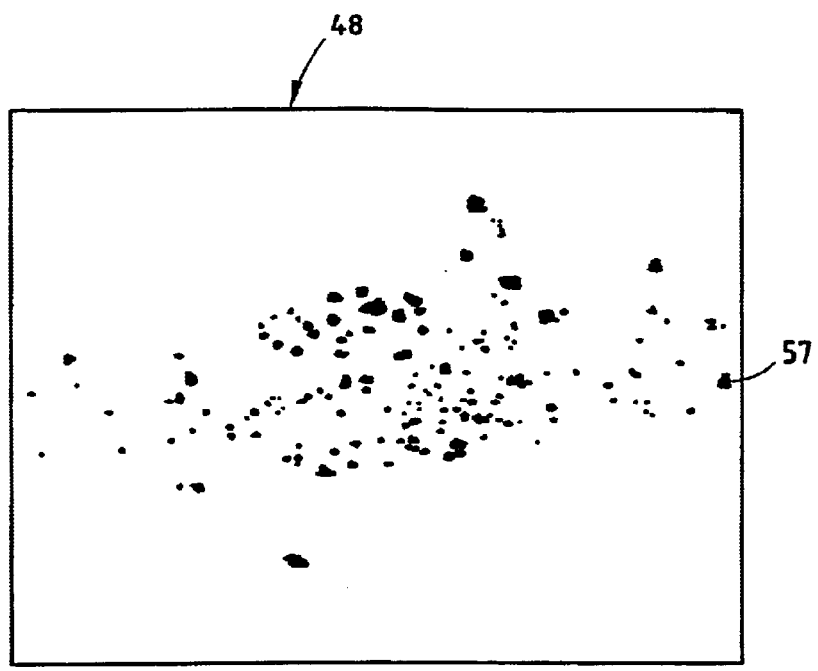
FIG. 14 is a simulated representation of rain droplets as sensed by a sensor and illuminated by an illumination source associated with the present invention.

Referring now to FIG. 7, a flow chart of a control process 200 of rain sensor system 16' begins at 205 by first grabbing an image 210 received by imaging array sensor and resetting the number of edge counts by edge detection function to zero 220. The sum of the light values sensed by the pixel in imaging array sensor is then determined and compared to a threshold value 230. If it is determined at 230 that the sum is greater than the threshold value, then the edge preserving smoothing algorithm may be activated at 235 and then the edge detection function is activated 240. Alternately, the smoothing algorithm may not be activated at 235 and may only be activated in situations where it is determined at 230 that the sum of the light values is less than the threshold value, as discussed below. The edges detected are then analyzed at 245 to determine if the number and/or size of the edges detected is greater than a threshold value. If it is determined at 245 that the number and/or size of the edges detected is greater than a threshold value, control process 200 functions to activate the wipers at 250. If the edges detected are less than the threshold value a "wiper off" signal is sent at 260. After the control sends the appropriate signal, the system returns 270 to its initial settings and resumes the sampling process 205.

If it is determined at 230 that the sum of the light values sensed by imaging array sensor are less than the threshold values, ambient sense logic function 54 activates or pulses an illumination source at 280. When the illumination source is pulsed, three more images are simultaneously taken at 290 by imaging array sensor, while three additional images are grabbed between the pulses or when the illumination source is otherwise off at 300. The control process then subtracts the data collected during the "off" frames from the data collected during the "on" frames at 310 to remove any noise from the signals. Once the noise has been removed, the edge preserving smoothing algorithm 35 is activated at 315 to remove or average a majority of any erroneous pixel data from the sampling signals. Following this filtering process, the edge detection function 44 is activated at 320 and the number and/or size of the edges detected are compared to a threshold value 330. If it is determined at 330 that the number and/or size of the edges are greater than the threshold value, the illumination source is deactivated 340 and a signal is communicated to activate the wipers 250 at an appropriate speed. On the other hand, if the number of edges detected is less than the threshold value, the illumination source is deactivated at 350 and a "wiper off" signal is communicated at 260. Once either signal is communicated to the wipers, the system 16' again returns 270 to its initial settings and resumes the sampling process 205.

In an alternate embodiment, a rain sensor system 120 further includes a polarizing filter 62. This may allow rain sensor system 120 to discern between rain 57 and fog or fogging 66 on window 19, such that control function 42 may activate either wipers 22 or blower 60 when necessary, as discussed below. Fog or fogging as used herein refers to condensation or moisture forming on interior surface 28 of window 19, and may include fogging on exterior surface 24 of window 19, such as in situations where an air conditioner is directed toward window 19 and moisture condenses on exterior surface 24 as the window is cooled. Polarizing filter 62 is positioned along an optic path 64 between illumination source 38 and illumination detector 36, and may be located between illumination source 38 and window 19 or between illumination detector 36 and window 19. By including a polarizing filter 62 according to the present invention, illumination detector 36 may be an inexpensive single element photo-sensor or the like, while still enabling rain sensor system 120 to detect and discriminate between fog and rain at window 19, thereby achieving optimal performance of the system at a potentially lower cost than a multi-element imaging array sensor.

Figure 8A:
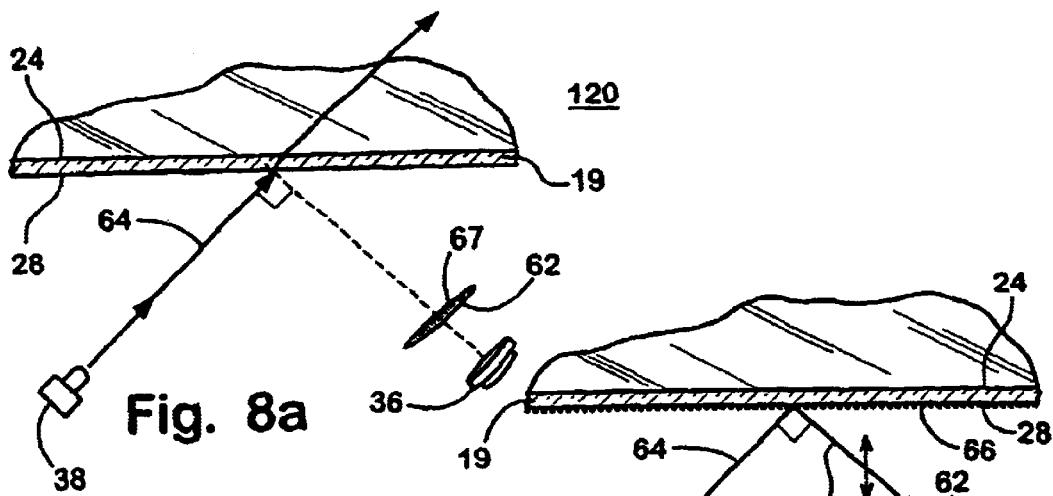
FIGS. 8a–c are graphic representations of side elevations of an alternate embodiment of a rain sensor with fog discrimination, illustrating operation thereof under different environmental conditions.
Figure 8B:
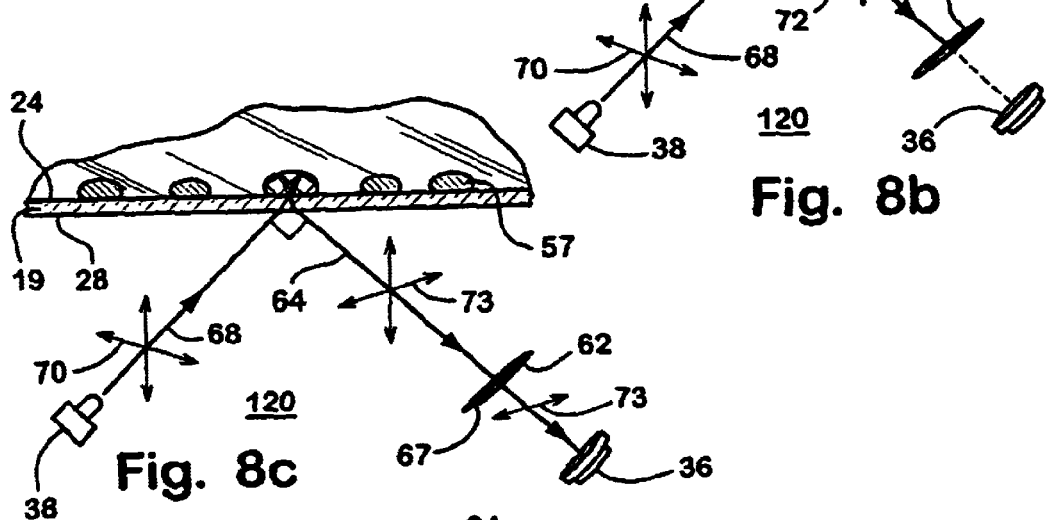
Figure 8C:
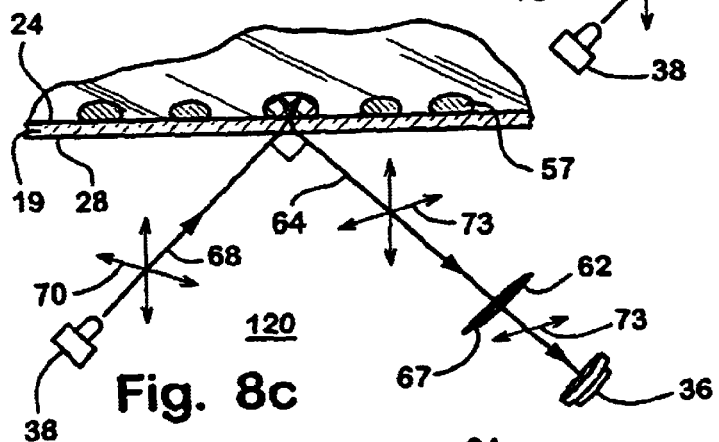

Referring now to FIGS. 8a, 8b and 8c, illumination source 38, illumination detector 36 and polarizing filter 62 are shown unattached to any base or bracket for clarity only, and are preferably mounted within a rear view mirror bracket or the like, as discussed above. Polarizing filter 62 is shown positioned between window 19 and illumination detector 36 and substantially reduces light that is oppositely polarized from a pass axis 67 within polarizing filter 62. When there is neither precipitation droplets present on exterior surface 24 of window 19 nor fog particles present on interior surface 28 of window 19, as illustrated in FIG. 8a, illumination detector 36 does not directly receive any substantial amount of light emitting from illumination source 38. This is due to the angle of window 19 relative illumination source 38 and detector 36, as light emitting from source 38 reflects downward from interior surface 28 of window 19 or refracts through window 19. However, as precipitation droplets become present on window 19 or fog particles 66 accumulate on interior surface 28 of window 19, light that radiates from illumination source 38 is directed toward illumination detector 36 as it either scatters and reflects due to rain droplets 57 on exterior surface 24 or is reemitted by a particle of fog 66 on interior surface 28 of window 19.

As illustrated in FIG. 8b, polarizing filter 62 substantially reduces light radiating from fog particle 66 that is received by illumination sensor 36. This is possible due to the fact that for most media, light is a transverse electromagnetic field, such that a non-polarized light ray, represented by line 68, has electromagnetic fields, generally represented by arrows 70, in all directions perpendicular to the direction that the light wave is traveling. Therefore, in order for light to propagate in any direction, the electromagnetic field coincident with the light ray must oscillate perpendicular to the direction of travel. When incident unpolarized light 68 is absorbed by a small enough particle, such as a particle of fog 66 or the like, the electrons of the particle vibrate in the directions of electromagnetic fields 70 present in the incident unpolarized light 68. The intensity of the light radiating from a small particle when illuminated by polarized light varies according to the equation:

$$I(\theta) = \frac{\rho_o^2 \omega^4 \sin^2\theta}{32\pi^2 c^3 \varepsilon_o r^2}; \text{ where } \omega = \frac{2\pi c}{\lambda};$$

where $\rho_0$ is the dipole moment, $\omega$ is the angular frequency of light, $\lambda$ is the wavelength of light, $c$ is the speed of light, $\varepsilon_o$ is the permittivity of free space, $r$ is the distance that the light is from the dipole, and $\theta$ is the angle of the radiated light relative to the direction of oscillation of the electrons in the particle. For non-polarized light striking a small particle, the overall intensity of the light radiated from the particle is a linear superposition of the intensities from each electromagnetic field oscillating within the incident light. As the light is radiated in a direction perpendicular to the incident ray of light, $\theta$ is approximately zero relative to the electrons oscillating along one of the electromagnetic fields, which results in a substantially zero intensity of light in that direction that is supported by that particular electromagnetic field. On the other hand, $\theta$ is simultaneously approximately 90 degrees relative to the direction of oscillation of electrons oscillating along another of the electromagnetic fields, which results in the light supported by the second electromagnetic field being at its greatest intensity. Therefore, the superposition of these intensities results in a light ray 72 re-emitting from a fog particle 66 that is substantially linearly polarized light when the emitted light propagates at approximately 90 degrees relative to the direction of the incident light, as the other directions of oscillation either were not present in the incident unpolarized light 68 or otherwise cannot support propagation of the light. However, as the size of the particle increases, such as to the size of a rain droplet, the polarization effect goes away. Therefore, while light re-emitting from a fog particle is substantially linearly polarized, light reflecting and scattering from a precipitation droplet is primarily non-polarized.

Preferably, illumination source 38 and illumination detector 36 are oriented relative one another at approximately an 80 to 100 degree angle at interior surface 28 of window 19. Most preferably, this angle is approximately 90 degrees. Polarizing filter 62 may be placed between window 19 and illumination detector 36 such that its pass axis 67 is perpendicular to an electromagnetic field present in the linear polarized light 72 emitting from the fog particle 66. As shown in FIG. 8b, for example, with illumination detector 36 and source 38 being oriented substantially horizontally, the polarized light 72 emitting from fog particle 66 toward illumination detector 36 is substantially vertically polarized. By orienting the pass axis 67 of polarizing filter 62 substantially horizontally, there will be substantial filtering of the polarized light ray 72 before it is received by illumination detector 36. Therefore, when fog particles 66 are present on interior surface 28 of window 19, illumination detector 36 receives a very weak signal, similar to the signal received when there is neither rain nor fog present on the window, thereby substantially reducing any possibility of illumination detector 36 receiving a false signal of rain droplets when there is merely fog particles 66 present on interior surface 28 of window 19.

As shown in FIG. 8c, when a precipitation droplet 57 is present on exterior surface 24 of window 19, incident unpolarized light 68 refracts through window 19 and reflects within the water droplets 57, resulting in a scattering of light back toward interior surface 28 of window 19. The light is reflected and scattered in many directions such that a substantial amount of light may be received by illumination detector 36, thereby generating a signal that there is rain present on exterior surface 24 of window 19. The scattered light remains unpolarized and thus passes through polarizing filter 62, as polarizing filter 62 merely polarizes the light, thereby allowing light that has its electromagnetic fields (shown as a horizontal line 73) substantially similar to the pass axis 67 of polarizing filter 62 to pass therethrough. Therefore, illumination detector 36 still receives a stronger signal when there are precipitation particles 57 on exterior surface 24 of window 19 than when there is either fog particles 66 present on interior surface 28 of window 19 or when there is neither fog nor rain present on window 19. After illumination detector 36 receives the polarized light ray as polarized by polarizing filter 62, control function 42 again functions to analyze the signal received and determine whether wipers 22 and 26 should be activated, as discussed above.

Alternately, polarizing filter 62 may be movably positioned in optic path 64, to allow illumination detector 36 to receive a signal alternating from polarized to non-polarized light by occasionally positioning polarizing filter 62 in optic path 64. This allows rain sensor system 120 to further discern between when fog is present, when rain is present, when both rain and fog are present, and when neither rain nor fog is present. The difference between the polarized and non-polarized signals received by illumination detector 36 is greater when fog is present on the window, compared to the difference between the strong signals received when rain alone is present on window 19. When fog is detected by control function 42, the intensity of each signal is measured to further determine if rain is also present on exterior surface 24. Subsequently, control 40' may further communicate with blower 60 within vehicle 18 to operate blower 60 and eliminate the fog on the interior surface of window 19 when a threshold value of fog is detected, while also activating wipers 22 if necessary. When weak signals are received both when the polarizer is present and when not present, neither rain nor fog is present on window 19.

In an alternate embodiment, as shown in FIGS. 9 and 10, a rain sensor system 130 further includes a second illumination detector 74 which defines a second optic path 76 between illumination source 38 and second detector 74 via window 19. A polarizing filter 62 may be positioned at any point along one or the other of the two optic paths 64 and 76. As shown in FIG. 9, polarizing filter 62 may be positioned between illumination detector 74 and window 19. Because polarizing filter 62 is positioned along optic path 76, illumination source 38 and second illumination detector 74 are preferably oriented relative one another at approximately an 80 to 100 degree angle at interior surface 28 of window 19, and most preferably at approximately a 90 degree angle. Illumination detector 36 may then be positioned substantially adjacent detector 74, preferably with an angle A between detectors 36 and 74 being minimized to be as close to zero degrees as possible, such that both detectors receive substantially the same light signal from window 19. When neither fog nor rain is present on window 19, as shown in FIG. 10a, neither first illumination detector 36 nor second illumination detector 74 receives a strong signal directly from illumination source 38. However, when rain is present on window 19, polarizing filter 62 polarizes a light ray 78 from illumination source 38 along optic path 76, such that a polarized light ray 80, which is received by illumination detector 74, is linearly polarized in one direction only, such as in the horizontal direction shown in FIG. 10c. A non-polarized light ray 82 is simultaneously received by first illumination detector 36. Therefore, when rain drops or other precipitation droplets are present on exterior surface 24 of window 19, both illumination detectors 36 and 74 will receive a signal as the non-polarized light rays 78 and 82 are reflected, refracted and scattered by the droplets present on window 19, such that a substantial portion of the scattered light is directed toward both illumination detectors 36 and 74. Because light ray 78 is not polarized when it reaches polarizing filter 62, polarizing filter 62 merely polarizes the light, which still allows polarized light ray 80 to be received by illumination detector 74.

When fog particles 66 alone are present at interior surface 28 of window 19, as shown in FIG. 10b, a polarized light ray 86 from fog particle 66 is emitted only in directions perpendicular to an incident ray of light 88 from illumination source 38. As discussed above, the orientation of illumination detector 74 relative to illumination source 38 is preferably at approximately a 90 degree angle along optic path 76, such that polarized light ray 86 is directed toward illumination detector 74. Therefore, polarizing filter 62, with its pass axis 67 oriented in a direction perpendicular to the electromagnetic field 92 in polarized light ray 86, functions to substantially filter out polarized light ray 86 so that substantially no signal is received by illumination detector 74 when fog is present on interior surface 28 of window 19. Conversely, illumination detector 36 simultaneously receives a non-filtered light ray 84 when fog is present on window 19. Light ray 84 may also be substantially polarized if illumination detector 36 is also oriented relative to illumination source 38 at approximately a 90 degree angle at window 19.

Because illumination detectors 36 and 74 receive different signals when fog is present, when rain is present, when both rain and fog are present and when neither rain nor fog is present on window 19, control function 42 may analyze the signals received by both illumination detectors 36 and 74 to determine if either fog is present on interior surface 28 or precipitation is present on exterior surface 24 of window 19 or both fog and precipitation are present. If the signal received by illumination detector 36 is approximately equal to twice the signal received by second illumination detector 74, then no fog is present, as non-polarized light passes through polarizing filter 62 and is received by illumination detector 74. Control function 42 then measures the intensity of the signals to determine if rain is present, as rain results in a greater intensity in the signal received due to scattering of light from rain droplet 57. On the other hand, if a signal is received by illumination detector 74, yet the signal received by illumination detector 36 is substantially greater than twice the signal received by second illumination detector 74, then control function 42 may conclude that fog is present on interior surface 28 of window 19, and activate blower 60 to defog the interior surface 28 of window 19. If fog is detected, control function 42 further measures and compares the intensities of the signals to determine if rain is also present on exterior surface 24. Illumination detectors 36 and 74 may either be single element photo-sensors or multi-element imaging arrays, both of which are capable of receiving the different signals reflecting or emitting from objects on window 19.

Another alternate embodiment of the present invention is shown in FIG. 11, where a rain sensor system 140 includes two illumination sources 38 and 94, one illumination detector 36 and a polarizing filter 62. In this embodiment, polarizing filter 62 may be positioned between illumination source 94 and window 19, such that illumination detector 36 receives light from a polarized source 94 and an unpolarized source 38. Illumination sources 38 and 94 are cycled alternately such that illumination detector 36 and control function 42 may determine which illumination source 38 or 94 the signal is being received from. The orientation of polarized source 94 and illumination detector 36 is preferably within a range of approximately 80 to 100 degrees relative one another, and most preferably approximately 90 degrees relative one another. This embodiment functions similar to those described above, in that when there is neither rain nor fog present on window 19, illumination detector 36 receives substantially no signal from both illumination sources 38 and 94. However, when small fog particles are present on interior surface 28 of window 19, a polarized beam or ray 96, having an electromagnetic field 95 in a single direction which is substantially perpendicular to light ray 96, passes through linear polarizer 62 and is absorbed and re-emitted by the particles. According to the light intensity equation for $I_{(\theta)}$ discussed above, when linearly polarized light strikes a fog particle, the intensity of light re-emitted will be approximately zero in a direction that is both along the direction of the electromagnetic field 95 present in the polarized ray of light and perpendicular to the incident ray of light, as the angle $\theta$ will be zero in that direction. By positioning illumination detector 36 along a path in this direction, illumination detector 36 receives substantially no signal from polarized illumination source 94 when fog is present on the interior surface 28 of window 19, yet still receives a strong signal from unpolarized illumination source 38. On the other hand, if rain alone is present on window 19, illumination detector 36 receives a strong signal from illumination source 38 and approximately a one-half signal from illumination source 94. Furthermore, if both fog and rain are present on window 19, illumination detector 36 again receives a strong signal from illumination source 38, but receives a signal from illumination source 94 that is greater than the approximately zero intensity signal received when fog alone is present, but less than the approximately one-half signal received when rain alone is present on window 19. Control function 42 compares the signals received from each illumination source 38 and 94 to determine if fog, rain, both fog and rain or neither fog nor rain is present on window 19, and correspondingly activate or deactivate the appropriate device. Illumination detector 36 of rain sensor system 140 is preferably an imaging array sensor, but may alternatively be a single element photo-sensor or the like.

Still yet another embodiment of the present invention is shown in FIG. 12, where a rain sensor system 150 includes a single illumination source 38 and two illumination detectors 36 and 102. A polarizing filter 62 is positioned between illumination source 38 and window 19, such that a light ray 104 from illumination source 38 is polarized to become a polarized light ray 106 before reflecting or emitting from window 19. Both detectors 36 and 102 are preferably oriented within a range of approximately 80 to 100 degrees relative one another, as represented by an angle B in FIG. 12, and further oriented within a range of approximately 80 to 100 degrees relative polarized illumination source 38. Most preferably, illumination detectors 36 and 102 and illumination source 38 are oriented at approximately 90 degrees relative one another. Polarizing filter 62 has little effect on rain sensor system 150 when rain is present on window 19 or when neither rain nor fog is present on window 19. However, when fog particles 66 are present on interior surface 28 of window 19, polarized light ray 106 is absorbed by fog particles 66 and is re-emitted with a minimal or substantially zero intensity in a direction parallel to the electromagnetic field that was present in polarized light ray 106. Therefore, by polarizing the light in the horizontal direction, as shown in FIG. 12, light in a vertical direction, or perpendicular to the pass axis 67 or polarized electromagnetic field, is emitted by the small particle of fog 66 with a much greater intensity than the light propagating parallel to the electromagnetic field. This results in second illumination detector 102 receiving polarized light 108 re-emitted from a fog particle, while first illumination detector 36 receives substantially no signal when fog is present on the interior surface of window 19. If the signal received by illumination detector 36 is approximately the same as the signal received by second illumination detector 102, then control function 42 may conclude that no fog is present on interior surface 28 of window 19. The intensity of the signals are then analyzed and compared to determine if rain alone is present on window 19. However, if the signal received by second illumination detector 102 is substantially greater than the signal received by illumination detector 36, then fog is present on interior surface 28 of window 19, and control function 42 may subsequently operate the blower to eliminate the fog and further compare the intensities of the signals received to determine if rain is also present on window 19.

Referring now to FIG. 13, an alternate embodiment of a rain sensor system 160 is diagrammed. Rain sensor system includes at least one illumination source 38, at least one illumination sensor 36 and a polarizing filter (not shown). A control 40" useful with rain sensor system 160 includes an ambient light logic function 54 to determine the intensity of ambient light and switch rain sensor system 160 between active and passive modes, as discussed above. Most preferably, ambient logic function 54 responds to the output of A/D converter 37 to determine ambient conditions as sensed by at least one of the imaging array sensors and further communicates with illumination source control 55 if ambient light is below a threshold value. Illumination source control 55 activates at least one of the illumination sources 38 so that light may be received by imaging array sensors 36. The polarizing filter 62 is positioned along at least one optic path between the illumination sources and the illumination sensors so as to filter or polarize light before it is received by at least one of the sensors, similar to the embodiments discussed above. Preferably, smoothing algorithm 35 is activated to average or smooth the sampled data to, for example, account for scratches and/or pits in window 19, as discussed above. Edge detection function 44 then analyzes the signal or signals received by the illumination sensor or sensors to determine if there is rain alone, fog alone, both rain and fog, or neither rain nor fog present on window 19. If rain is detected, edge detection function 44 determines if the amount of rain is above a threshold value, while if fog is detected, the control 40" further analyzes the signals to determine if the level of fog is above a threshold value. Accordingly, either wipers 22, blower 60 or both are activated by control 40", if necessary.

While several alternate embodiments have been depicted and described above, clearly the present invention may include other variations where there are one or two illumination sources and detectors, with at least one polarizing filter positioned along an optic path defined by one of the illumination detectors and one of the illumination sources via window 19, without affecting the scope of the present invention. Polarizing filter 62 may be positioned between an illumination source and window 19 or between an illumination detector and window 19, and may be oriented such that its pass axis 67 allows linearly polarized light to pass therethrough in such a fashion as to allow the rain sensor system to discern between unpolarized light being scattered from rain drops 40 on exterior surface 24 of window 19 and linearly polarized light being emitted from a particle of 66 on interior surface 28 of window 19. Although shown and described as detecting fogging at a front windshield of vehicle 18, the rain sensor of the present invention may detect fogging at interior and/or exterior surfaces of other windows on vehicle 18, such as side or rear windows. The rain sensor may further control an appropriate blower to direct dryer air toward the window at which the fogging was detected in order to reduce the fogging on that particular window. Most preferably, in order to optimize the rain sensor system so as to best determine when fog or fogging is present at interior surface 28 of window 19, at least one set of illumination sources and sensors is preferably oriented such that the optical path to the corresponding sensor or source is at approximately a 90 degree angle between the source and sensor at the interior surface 28 of window 19. This orientation best allows the system to determine when small particles of fog are present, while not inadvertently concluding that fog is present when rain is actually present on exterior surface 24.

Although shown and described as being useful with a rain sensor, filtering process 35 may be useful with other vehicular systems which include an imaging sensor which receives an image through a window or windshield. For example, filtering process 35 may be useful with vehicular headlamp controls of the type disclosed in commonly assigned U.S. Pat. No. 5,796,094, vehicle back up aids of the type disclosed in commonly assigned co-pending patent application, Ser. No. 09/199,907, filed Nov. 25, 1998 by Bos et al., the disclosure of which is hereby incorporated herein by reference, or other vehicular vision systems. Filtering process 35 may then filter or smooth data associated with irregularities on the window or transparent panel through which the vision system is directed, while having a minimal affect on headlight and taillight or rearward scene data received by the particular imaging sensors.

The concepts of the present invention may be used in association with rain sensor interior mirror assemblies wherein a rain sensor functionality is provided in association with an interior rearview mirror assembly. Such association includes utilizing an element of the rearview mirror assembly (such as a plastic housing attached, for example, to the mirror channel mount that conventionally attaches the mirror assembly to a windshield button slug) to cover a windshield-contacting rain sensor. The rearview mirror assembly can include a display function (or multiple display functions).

These displays may perform a single display function or multiple display functions such as providing indication of an additional vehicle function, such as a compass mirror display function, a temperature display functions, status of inflation of tires display function, a passenger air bag disable display function, an automatic rain sensor operation display function, telephone dial information display function, highway status information display function, blind spot indicator display function, or the like, such display may be an alpha-numerical display or a multi-pixel display, and may be fixed or scrolling. Such an automatic rain sensor operation display function may include a display function related to a both a windshield-contacting and a non-windshield-contacting rain sensor, including, for example, where the circuitry to control the rain sensor, electrochromic dimming of a variable reflectance electrochromic mirror, and any other mirror-mounted electronic feature are commonly housed in or on a rearview mirror assembly and wholly or partially share components on a common circuit board. The blind spot detection display or the automatic rain sensor operation display may alternate with other display functions by a display toggle which may be manually operated, time-shared, voice-actuated, or under the control of some other sensed function, such as a change in direction of the vehicle or the like. Should a rain sensor control be associated with, incorporated in, or coupled to the interior rearview mirror assembly, the rain sensor circuitry, in addition to providing automatic or semi-automatic control over operation of the windshield wipers (on the front and/or rear windshield of the vehicle), can control the defogger function to defog condensed vapor on an inner cabin surface of a vehicle glazing (such as the inside surface of the front windshield, such as by operating a blower fan, heater function, air conditioning function, or the like), or the rain sensor control can close a sunroof or any other movable glazing should rain conditions be detected. As stated above, it may be advantageous for the rain sensor control (or any other feature such as a head-lamp controller, a remote keyless entry receiver, a cellular phone including its microphone, a digital voice recorder, a video camera for a video phone, a taxi meter and/or taxi meter display, a vehicle status indicator and the like) to share components and circuitry with the electrochromic mirror function control circuitry and electrochromic mirror assembly itself. Also, a convenient way to mount a non-windshield-contacting rain sensor such as described herein is by attachment, such as by snap-on attachment, as a module to the mirror channel mount such as is described in U.S. Pat. No. 5,576,678 entitled "Mirror Support Bracket," invented by R. Hook et al. and issued Nov. 19, 1996, the disclosure of which is hereby incorporated by reference herein. The mirror mount and/or windshield button may optionally be specially adapted to accommodate a non-windshield-mounting rain sensor module. Such mounting as a module is readily serviceable and attachable to a wide variety of interior mirror assemblies (both electrochromic and non-electrochromic such as prismatic, manually adjusted mirror assemblies), and can help ensure appropriate alignment of the non-windshield-mounted variety of rain sensor to the vehicle windshield insofar that the module attached to the mirror mount remains fixed whereas the mirror itself (which typically attaches to the mirror channel mount via a single or double ball joint) is movable so that the driver can adjust its field of view. Also, should smoke from cigarettes and the like be a potential source of interference to the operation of the non-windshield-contacting rain sensor, then a mirror-attached housing can be used to shroud the rain sensor unit and shield it from smoke (and other debris). Optionally, such ability to detect presence of cigarette smoke can be used to enforce a non-smoking ban in vehicles, such as is commonly requested by rental car fleet operators. Also, when a rain sensor (contacting or non-contacting) is used to activate the wiper on the rear window (rear backlight) of the vehicle, the sensor can be conveniently packaged and mounted with the CHMSL (center high mounted stop light) stop light assembly commonly mounted on the rear window glass or close to it. Mounting of the rain sensor with the CHMSL stoplight can be aesthetically appealing and allow sharing of components/wiring/circuitry.

The concepts of this present invention can be used with interior rearview mirrors equipped with a variety of features such as a high/low (or daylight running beam/low) headlamp controller, a hands-free phone attachment, a video camera for internal cabin surveillance and/or video telephone function, seat occupancy detection, map reading lights, compass/temperature display, taxi meter display, fuel level and other vehicle status display, a trip computer, an intrusion detector and the like. Again, such features can share components and circuitry with the electrochromic mirror circuitry and assembly so that provision of these extra features is economical.

Placement of a video camera either at, within, or on the interior rearview mirror io assembly (including within or on a module attached to a mirror structure such as the mount that attaches to the windshield button) has numerous advantages. For example, the mirror is centrally and high mounted and the camera can be unobtrusively mounted.

Therefore, a rain sensor is disclosed herein that provides an accurate method of detecting rain on a vehicle window by actually capturing an image of an area on the window and further determining when the amount of precipitation present on the window reaches a predetermined threshold value before activating the wiper system of the vehicle. The rain sensor preferably includes a filtering or smoothing algorithm in order to account for scratches on the vehicle window, thereby substantially precluding false rain detection due to scratches or pits which occur on a vehicle window surface over time. The rain sensor may further detect both fogging and rain at the window, and is able to discriminate therebetween. The rain sensor of the present invention is also decoupled from the window to avoid replacement concerns and the like that are present with many of the rain sensors in use today. Furthermore, the rain sensor of the present invention provides optimal performance by detecting both fog and rain on the window, while providing a system that may implement standard, low cost single element photo-sensors and photodiodes or the like.

Changes and modifications in his specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as followed:

1. An interior rearview mirror system suitable for use in a vehicle, said interior rearview mirror system comprising:
   an interior rearview mirror assembly adapted for attachment to an interior portion of the vehicle, said interior rearview mirror assembly comprising a housing and a reflective element included within said housing; and
   a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield; and
   a control operable to receive a signal from said imaging sensor, said control being operable to control a headlamp of the vehicle and to control at least one of a windshield wiper of the vehicle and a defogging system of the vehicle in response to said signal wherein said imaging sensor is operable as a component of an active cruise control system.

2. The interior rearview mirror system of claim 1, wherein said imaging sensor is operable to determine the speed at which the vehicle is traveling.

3. An interior rearview mirror system suitable for use in a vehicle, said interior rearview mirror system comprising:
   an interior rearview mirror assembly adapted for attachment to an interior portion of the vehicle, said interior rearview mirror assembly comprising a housing and a reflective element included within said housing; and
   a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield; and
   a control operable to receive a signal from said imaging sensor, said control being operable to control a headlamp of the vehicle and to control at least one of a windshield wiper of the vehicle and a defogging system of the vehicle in response to said signal, said imaging sensor being operable to sense water droplets at the exterior surface of the windshield and fog particles at the interior surface of the windshield, said control being operable to control a windshield wiper of the vehicle in response to the presence of water droplets at the exterior surface of the windshield and to control a defogging system of the vehicle in response to the presence of fog particles at the interior surface of the windshield, wherein said control is operable to control a headlamp of the vehicle in response to the presence of water droplets at the exterior surface of the windshield.

4. The interior rearview mirror system of claim 3, wherein said control is operable to control a headlamp of the vehicle in response to a level of light present at the windshield.

5. The interior rearview mirror system of claim 4, wherein said control is operable to control a movable window of the vehicle in response to the presence of water droplets at the exterior surface of the windshield.

6. An interior rearview mirror system suitable for use in a vehicle, said interior rearview mirror system comprising:
   an interior rearview mirror assembly adapted for attachment to an interior portion of the vehicle, said interior rearview mirror assembly comprising a housing and a reflective element included within said housing; and
   a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield; and a control operable to receive a signal from said imaging sensor, said control being operable to control a headlamp of the vehicle and to control at least one of a windshield wiper of the vehicle and a defogging system of the vehicle in response to said signal, said imagine sensor being operable to sense water droplets at the exterior surface of the windshield and fog particles at the interior surface of the windshield, said control being operable to control a windshield wiper of the vehicle in response to the presence of water droplets at the exterior surface of the windshield and to control a defogging system of the vehicle in response to the presence of fog particles at the interior surface of the windshield, said control being operable to vary a rate of wine of a windshield wiper of the vehicle wherein said control is operable to vary the rate of wipe according to a density of water droplets on the exterior surface of the windshield.

7. The interior rearview mirror system of claim 6, wherein said control is operable to control a movable window of the vehicle in response to said signal.

8. The interior rearview mirror system of claim 7, wherein said control is operable to control a sunroof of the vehicle to close the sunroof in response to the presence of precipitation at the exterior surface of the windshield.

9. The interior rearview mirror system of claim 6, wherein said control comprises a micro-computer having at least one of an embedded control application, a custom digital logic circuit and a digital signal processor circuit.

10. The interior rearview mirror system of claim 9, wherein said imaging array comprises circuitry capable of producing at least one digital signal.

11. The interior rearview mirror system of claim 10, wherein said control is operable to digitally process said at least one digital signal.

12. The interior rearview mirror system of claim 6, wherein said control is operable to control a headlamp of the vehicle in response to a level of light sensed at the vehicle.

13. The interior rearview mirror system of claim 12, wherein said imaging sensor is operable to sense a level of ambient light present at the vehicle.

14. The interior rearview mirror system of claim 13, wherein said control is operable to control a headlamp of the vehicle in response to said imaging sensor sensing low light conditions.

15. The interior rearview mirror system of claim 6, wherein said interior rearview mirror assembly comprises an electrochromic interior rem-view mirror assembly and said reflective element comprises an electrochromic reflective element, said electrochromic interior rearview mirror assembly comprising electrochromic control circuitry for controlling said electrochromic reflective element.

16. The interior rearview mirror system of claim 15, wherein said control shares at least one component of said electrochromic control circuitry.

17. The interior rearview mirror system of claim 16, wherein said control shares said at least one component on a common circuit board of said electrochromic interior rearview mirror assembly.

18. The interior rearview mirror system of claim 6, wherein said control is operable to control at least one other accessory of the vehicle.

19. The interior rearview mirror system of claim 6, including an illumination device for illuminating the field of view of said imaging sensor.

20. The interior rearview mirror system of claim 19, wherein said illumination device provides infrared illumination.

21. The interior rearview mirror system of claim 19, wherein said illumination device is at least occasionally activated.

22. The interior rearview mirror system of claim 21, wherein said illumination device is pulsed on and off.

23. The interior rearview mirror system of claim 6, wherein said imaging sensor comprises an imaging array sensor.

24. The interior rearview mirror system of claim 23, wherein said imaging array sensor comprises a pixelated imaging array sensor.

25. The interior rearview mirror system of claim 23, wherein said imaging array sensor comprises a CMOS sensor.

26. The interior rearview mirror system of claim 6, wherein said video device includes a lens disposed between said imaging sensor and the interior surface of the windshield.

27. The interior rearview mirror system of claim 26, wherein said lens functions to establish a small depth of field.

28. The interior rearview mirror system of claim 27, wherein said lens focuses said imaging sensor on an area at or immediately adjacent to the windshield of the vehicle.

29. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imaging sensor, said imaging sensor being positioned at said interior rearview mirror assembly and having a field of view forward and through the windshield, said magma sensor being operable to at least sense precipitation at at least one of an exterior surface of the windshield and an interior surface of the windshield; and
a control operable to receive a signal from said imaging sensor, said control being operable to control a headlamp of the vehicle and to control at least one of a windshield wiper of the vehicle and a defogging system of the vehicle in response to said signal, said imaging sensor being operable to sense fog particles at the interior surface of the windshield, said control being operable to control a defogging system of the vehicle in response to said imaging sensor sensing fog particles at the interior surface of the windshield wherein said control is operable to adjust a blower level of the defogging system of the vehicle in response to a density of the fog particles sensed at the interior surface of the windshield.

30. The interior rearview mirror of claim 29, wherein said F system imaging sensor is operable to sense water droplets at an exterior surface of the windshield, said control being operable to control a windshield wiper of the vehicle in response to said imaging sensor sensing water droplets at the exterior surface of the windshield.

31. The interior rearview mirror system of claim 30, wherein said control is operable to adjust a rate of wipe of a windshield wiper of the vehicle.

32. The interior rearview mirror system of claim 31, wherein said control is operable to adjust the rate of wipe in response to a quantity of the water droplets sensed at the exterior surface of the windshield.

33. The interior rearview mirror system of claim 31, wherein said control is operable to control a rear window wiper of the vehicle.

34. The interior rearview mirror system of claim 33, wherein said control is operable to control a rear window wiper in response to said imaging sensor sensing water droplets at the exterior surface of the windshield.

35. An interior rearview mirror system suitable for use in a vehicle, said interior rearview mirror system comprising:
    an interior rearview mirror assembly adapted for attachment to an interior portion of the vehicle, said interior rearview mirror assembly comprising a housing and a reflective element included within said housing; and
    a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield; and
    a control operable to receive a signal from said imaging sensor, said control being operable to control a headlamp of the vehicle and to control at least one of a windshield wiper of the vehicle and a defogging system of the vehicle in response to said signal, said imaging sensor being operable to sense water droplets at an exterior surface of the windshield, said control being operable to control a windshield wiper of the vehicle in response to said imaging sensor sensing water droplets at the exterior surface of the windshield, said control being operable to adjust a rate of wipe of a windshield wiper of the vehicle and said control being operable to control a rear window wiper of the vehicle, said control being operable to control the rear window wiper in response to said imaging sensor sensing water droplets at the exterior surface of the windshield, wherein said control causes a rear window wiper to cycle for every N cycles of a windshield wiper, wherein N is greater than one.

36. The interior rearview mirror system of claim 35, wherein the value of N varies as a function of the speed of a windshield wiper.

37. An interior rearview mirror system suitable for use in a vehicle, said interior rearview mirror system comprising:
    an interior rearview mirror assembly adapted for attachment to an interior portion of the vehicle, said interior rearview mirror assembly comprising a housing and a reflective element included within said housing; and
    a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield:
    a control operable to receive a signal from said imaging sensor, said control being operable to control a headlamp of the vehicle and to control at least one of a windshield wiper of the vehicle and a deforming system of the vehicle in response to said signal; and
    an illumination device for illuminating the field of view of said imaging sensor, said illumination device being pulsed on and off, wherein said imaging sensor comprises a shutter for exposing said imaging sensor to the field of view forwardly and through the windshield.

38. The interior rearview mirror system of claim 37, wherein during low light conditions, said shutter is opened to expose said imaging sensor to the windshield when said illumination device is pulsed on and closed to not expose said imaging sensor to the windshield when said illumination device is pulsed off.

39. An interior rearview mirror system suitable for use in a vehicle, said interior rearview mirror system comprising:
    an interior rearview mirror assembly adapted for attachment to an interior portion of the vehicle, said interior rearview mirror assembly comprising a housing and a reflective element included within said housing; and
    a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield;
    a control operable to receive a signal from said imaging sensor, said control being operable to control a headlamp of the vehicle and to control at least one of a windshield wiper of the vehicle and a defogging system of the vehicle in response to said signal; and
    an illumination device for illuminating the field of view of said imagine sensor, said illumination device being at least occasionally activated, wherein said illumination device is activated during low light conditions.

40. The interior rearview mirror system of claim 39, wherein said imaging sensor is operable to sense water droplets at the exterior surface of the windshield and fog particles at the interior surface of the windshield.

41. The interior rearview mirror system of claim 40, wherein said control is operable to control a windshield wiper of the vehicle in response to the presence of water droplets at the exterior surface of the windshield and to control a defogging system of the vehicle in response to the presence of fog particles at the interior surface of the windshield.

42. The interior rearview mirror system of claim 41, wherein said control is operable to vary a rate of wipe of a windshield wiper of the vehicle.

43. The interior rearview mirror system of claim 39, wherein said imaging sensor is operable to sense fog particles at the interior surface of the windshield, said control being operable to control a defogging system of the vehicle in response to said imaging sensor sensing fog particles at the interior surface of the windshield.

44. An interior rearview mirror system suitable for use in a vehicle, said interior rearview mirror system comprising:
    an interior rearview mirror assembly adapted for attachment to an interior portion of the vehicle, said interior rearview mirror assembly comprising a housing and a reflective element included within said housing;
    a video device, said video device including an imaging sensor, said imaging sensor being positioned at said interior rearview mirror assembly and having a field of view forward and through the windshield, said imaging sensor being operable to at least sense precipitation at at least one of an exterior surface of the windshield and an interior surface of the windshield;
    a control operable to receive a signal from said imaging sensor, said control being operable to control a headlamp of the vehicle and to control at least one of a windshield wiper of the vehicle and a defogging system of the vehicle in response to said signal; and
    an illumination device for illuminating the field of view of said imaging sensor, said illumination device being at least occasionally activated, wherein said imaging sensor is operable to sense a level of ambient light present at the windshield, said illumination device being activated in response to said imaging sensor sensing low light conditions.

45. The interior rearview mirror system of claim 44, wherein said control is operable to control a headlamp of the vehicle in response to said imaging sensor sensing low light conditions.

46. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imagine sensor, said imaging sensor being positioned at said interior rearview mirror assembly and having a field of view forward and through the windshield, said imaging sensor being operable to at least sense precipitation at at least one of an exterior surface of the windshield and an interior surface of the windshield wherein said video device includes a polarizing filter; and
a control operable to receive a signal from said imaging sensor, said control being operable to control a headlamp of the vehicle and to control at least one of a windshield wiper of the vehicle and a defogging system of the vehicle in response to said signal.

47. The interior rearview mirror system of claim 46, wherein said polarizing filter is at least occasionally positionable between said imaging sensor and the windshield, said polarizing filter being operable to attenuate polarized light from the windshield.

48. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imaging sensor, said imaging sensor having a field of view forward through the windshield, said imaging sensor being operable to at least sense precipitation at at least one of an exterior surface of the windshield and an interior surface of the windshield; and
a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal, wherein said imaging sensor is operable as a component of an active cruise control system.

49. The interior rearview mirror system of claim 48, wherein said imaging sensor is operable to determine the speed at which the vehicle is traveling.

50. An interior rearview mirror suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imaging sensor, said imaging sensor having a field of view forward through the windshield, said imaging sensor being operable to at least sense precipitation at at least one of an exterior surface of the windshield and an interior surface of the windshield, said imaging sensor being operable to sense water droplets at the exterior surface of the windshield and fog particles at the interior surface of the windshield; and
a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal, said control being operable to control a windshield wiper of the vehicle in response to the presence of water droplets at the exterior surface of the windshield and to control a defogging system of the vehicle in response to the presence of for particles at the interior surface of the windshield wherein said control is operable to control a headlamp of the vehicle in response to the presence of water droplets at the exterior surface of the windshield.

51. The interior rearview minor system of claim 50, wherein said control is operable to control a headlamp of the vehicle in response to a level of light present at the windshield.

52. The interior rearview mirror system of claim 50, wherein said control is operable to control a movable window of the vehicle in response to the presence of water droplets at the exterior surface of the windshield.

53. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imaging sensor, said imagine sensor having a field of view forward through the windshield, said imaging sensor being operable to at least sense precipitation at at least one of an exterior surface of the windshield and an interior surface of the windshield, said imaging sensor being operable to sense water droplets at the exterior surface of the windshield and fog particles at the interior surface of the windshield; and
a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal, said control being operable to control a windshield wiper of the vehicle in response to the presence of water droplets at the exterior surface of the windshield and to control a defogging system of the vehicle in response to the presence of fog particles at the interior surface of the windshield, said control being operable to vary a rate of wipe of a windshield wiper of the vehicle, wherein said control is operable to vary the rate of wipe according to a density of water droplets on the exterior surface of the windshield.

54. The interior rearview mirror system of claim 53, wherein said control is operable to control a headlamp of the vehicle and to control a windshield wiper of the vehicle in response to said signal.

55. The interior rearview mirror system of claim 53, wherein said control is operable to control a movable window of the vehicle in response to said signal, said movable window comprising a sunroof of the vehicle.

56. The interior rearview mirror system of claim 55, wherein said control is operable to control the sunroof of the vehicle to close the sunroof in response to the presence of precipitation at the exterior surface of the windshield.

57. The interior rearview mirror system of claim 48, wherein said control comprises a micro-computer having at least one of an embedded control application, a custom digital logic circuit and a digital signal processor circuit.

58. The interior rearview mirror system of claim 57, wherein said imaging array comprises circuitry capable of producing at least one digital signal.

59. The interior rearview mirror system of claim 53, wherein said control is operable to control a headlamp of the vehicle in response to a level of light sensed at the vehicle.

60. The interior rearview mirror system of claim 59, wherein said imaging sensor is operable to sense a level of ambient light present at the vehicle.

61. The interior rearview mirror system of claim 60, wherein said control is operable to control a headlamp of the vehicle in response to said imaging sensor sensing low light conditions.

62. The interior rearview mirror system of claim 53, wherein said interior rearview mirror assembly comprises an electrochromic interior rearview mirror assembly and said reflective element comprises an electrochromic reflective element, said electrochromic interior rearview mirror assembly comprising electrochromic control circuitry for controlling said electrochromic reflective element.

63. The interior rearview mirror system of claim 62, wherein said control shares at least one component of said electrochromic control circuitry.

64. The interior rearview mirror system of claim 63, wherein said control shares said at least one component on a common circuit board of said electrochromic interior rearview mirror assembly.

65. The interior rearview mirror system of claim 53, wherein said control is operable to control at least one other accessory of the vehicle.

66. The interior rearview mirror system of claim 53 including an illumination device for illuminating the field of view of said imaging sensor.

67. The interior rearview mirror system of claim 66, wherein said illumination provides infrared illumination.

68. The interior rearview mirror system of claim 66, wherein said illumination device is at least occasionally activated.

69. The interior rearview mirror system of claim 68, wherein said illumination device is pulsed on and off.

70. The interior rearview mirror system of claim 53, wherein said imaging sensor comprises an imaging array sensor.

71. The interior rearview mirror system of claim 70, wherein said imaging array sensor comprises a pixelated imaging array sensor.

72. The interior rearview mirror system of claim 70, wherein said imaging array sensor comprises a CMOS sensor.

73. The interior rearview mirror system of claim 53, wherein said video device includes a lens disposed between said imaging sensor and an interior surface of the windshield of the vehicle.

74. The interior rearview mirror system of claim 73, wherein said lens functions establish a small depth of field.

75. The interior rearview mirror system of claim 74, wherein said lens focuses said imaging sensor on an area at or immediately adjacent to the windshield of the vehicle.

76. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imaging sensor, said imaging sensor having a field of view forward through the windshield, said imaging a sensor being operable to at least sense precipitation at at least one of an exterior surface of the windshield and an interior surface of the windshield; and
a control operable to receive a signal from said imaging sensor, said control being operable to digitally Process said signal and to control at least two of(i) a headlamp of the vehicle, (ii) a windshield wiper of the vehicle, (iii) a defogging system of the vehicle and (iv) a movable window of the vehicle in response to said signal, said imaging sensor being operable to sense foe particles at the interior surface of the windshield, said control being operable to control a defogging system of the vehicle in response to said imagine sensor sensing foe particles at the interior surface of the windshield wherein said control is operable to adjust a blower level of the defogging system of the vehicle in response to a density of the fog particles sensed at the interior surface of the windshield.

77. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imagine sensor, said imaging sensor having a field of view forward through the windshield, said imaging sensor being operable to at least sense precipitation at at least one of an exterior surface of the windshield and an interior surface of the windshield, said imagine sensor being operable to sense water droplets at an exterior surface of the windshield; and
a control operable to receive a signal from said imagine sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal, said control being operable to control a windshield wiper of the vehicle in response to said imaging sensor sensing water droplets at the exterior surface of the windshield, said control being operable to adjust a rate of wipe of a windshield wiper of the vehicle, said control being operable to control a rear window wiper of the vehicle, said control being operable to control a rear window wiper in response to said imaging sensor sensing water droplets at the exterior surface of the windshield, wherein said control causes a rear window wiper to cycle for every N cycles of a windshield wiper, wherein N is greater than one.

78. The interior rearview mirror system of claim 77, wherein the value of N varies as a function of the speed of a windshield wiper.

79. An interior rearview mirror system suitable for use in a vehicle, said interior rearview mirror system comprising:
an interior rearview mirror assembly adapted for attachment to an interior portion of the vehicle, said interior rearview mirror assembly comprising a housing and a reflective element included within said housing; and
a video device, said video device including an imaging sensor, said imaging sensor having a field of view forward through the windshield, said imaging sensor being operable to at least sense precipitation at at least one of an exterior surface of the windshield and an interior surface of the windshield; and a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal; and an illumination device for illuminating the field of view of said imaging sensor, said illumination device being pulsed on and off, wherein said imaging sensor comprises a shutter for exposing said imaging sensor to the field of view forwardly and through the windshield.

80. The interior rearview mirror system of claim 79, wherein during low light conditions, said shutter is opened to expose said imaging sensor to the windshield when said illumination device is pulsed on and closed to not expose said imaging sensor to the windshield when said illumination device is pulsed off.

81. An interior rearview mirror system suitable for use in a vehicle, said interior rearview mirror system comprising:

an interior rearview mirror assembly adapted for attachment to an interior portion of the vehicle, said interior rearview mirror assembly comprising a housing and a reflective element included within said housing; and a video device, said video device including an imaging sensor, said imaging sensor having a field of view forward through the windshield, said imaging sensor being operable to at least sense precipitation at at least one of an exterior surface of the windshield and an interior surface of the windshield; and a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal; and an illumination device for illuminating the field of view of said imaging sensor, said illumination device being at least occasionally activated, wherein said illumination device is activated during low light conditions.

82. The interior rearview mirror system of claim 57, wherein said imaging sensor is operable to sense water droplets at the exterior surface of the windshield and fog particles at the interior surface of the windshield.

83. The interior rearview mirror system of claim 82, wherein said control is operable to control a windshield wiper of the vehicle in response to the presence of water droplets at the exterior surface of the windshield and to control a defogging system of the vehicle in response to the presence of fog particles at the interior surface of the windshield.

84. The interior rearview mirror system of claim 83, wherein said control is operable to vary a rate of wipe of a windshield wiper of the vehicle.

85. The interior rearview mirror system of claim 81, wherein said imaging sensor is operable to sense fog particles at the interior surface of the windshield, said control being operable to control a defogging system of the vehicle in response to said imaging sensor sensing fog particles at the interior surface of the windshield.

86. The interior rearview mirror system of claim 81, wherein said imaging sensor is operable to sense water droplets at an exterior surface of the windshield, said control being operable to control a windshield wiper of the vehicle in response to said imaging sensor sensing water droplets at the exterior surface of the windshield.

87. The interior rearview mirror system of claim 81, wherein said control is operable to adjust a rate of wipe of a windshield wiper of the vehicle.

88. The interior rearview mirror system of claim 87, wherein said control is operable to adjust the rate of wipe in response to a quantity of the water droplets sensed at the exterior surface of the windshield.

89. The interior rearview mirror system of claim 87, wherein said control is operable to control a rear window wiper of the vehicle.

90. The interior rearview minor system of claim 89, wherein said control is operable to control a rear window wiper in response to said imaging sensor sensing water droplets at the exterior surface of the windshield.

91. An interior rearview mirror system suitable for use in a vehicle, said interior rearview mirror system comprising:

an interior rearview mirror assembly adapted for attachment to an interior portion of the vehicle, said interior rearview mirror assembly comprising a housing and a reflective element included within said housing; and a video device, said video device including an imaging sensor, said imaging sensor having a field of view forward through the windshield, said imaging sensor being operable to at least sense precipitation at at least one of an exterior surface of the windshield and an interior surface of the windshield; and a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal; and an illumination device for illuminating the field of view of said imaging sensor, said illumination device being at least occasionally activated wherein said imaging sensor is operable to sense a level of ambient tight present at the windshield, said illumination device being activated in response to said imaging sensor sensing low light conditions.

92. The interior rearview mirror system of claim 91, wherein said control is operable to control a headlamp of the vehicle in response to said imaging sensor sensing low light conditions.

93. An interior rearview mirror system suitable for use in a vehicle, said interior rearview mirror system comprising:

an interior rearview mirror assembly adapted for attachment to an interior portion of the vehicle, said interior rearview mirror assembly comprising a housing and a reflective element included within said housing; and a video device, said video device including an imagine sensor, said imaging sensor having a field of view forward through the windshield, said imaging sensor being operable to at least sense precipitation at at least one of an exterior surface of the windshield and an interior surface of the windshield wherein said video device includes a polarizing filter; and a control operable to receive a signal from said imaging sensor, said control being operable to digitally process said signal and to control at least two of (i) a headlamp of the vehicle, (ii) a windshield wiper of the vehicle, (iii) a defogging system of the vehicle and (iv) a movable window of the vehicle in response to said signal.

94. The interior rearview mirror system of claim 93, wherein said polarizing filter is at least occasionally positionable between said imaging sensor and the windshield, said polarizing filter being operable to attenuate polarized light from the windshield.

95. An interior rearview mirror system suitable for use in a vehicle, said interior rearview mirror system comprising;
   an electrochromic interior rearview mirror assembly adapted for attachment to an interior portion of the vehicle, said interior rearview mirror assembly comprising a housing and an electrochromic reflective element included within said housing said electrochromic interior rearview mirror assembly comprising electrochromic control circuitry for controlling said electrochromic reflective element; and
   a video device, said video device including an imagine array sensor, said imaging array sensor having a field of view forward through the windshield; and
   a control sharing at least one component of said electrochromic control circuitry, said control receiving a signal from said imaging array sensor and being operable to digitally process said signal and to control at least two of (i) a headlamp of the vehicle, (ii) a windshield wiper of the vehicle, (iii) a defogging system of the vehicle and (iv) a movable window of the vehicle in response to said signal, wherein said imaging array sensor is operable as a component of an active cruise control system.

96. The interior rearview mirror system of claim 95, wherein said imaging array sensor is operable to determine the speed at which the vehicle is traveling.

97. An interior rearview mirror system suitable for use in a vehicle, said interior rearview mirror system comprising:
   an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry (or controlling said electrochromic reflective element; and
   a video device, said video device including an imaging a array sensor, said imaging array sensor having a field of view forward through the windshield, said imaging array sensor being operable to sense precipitation at at least one of an exterior surface of the windshield and an interior surface of the windshield, said imaging array sensor being operable to sense water droplets at the exterior surface of the windshield and fog particles at the interior surface of the windshield; and
   a control sharing at least one component of said electrochromic control circuitry, said control receiving a signal from said imaging array sensor and being operable to digitally process said signal and to control at least two of(i) a headlamp of the vehicle, (ii) a windshield wiper of the vehicle, (ii) a defogging system of the vehicle and (iv) a movable window of the vehicle in response to said signal, said control being operable to control a windshield wiper of the vehicle in response to the presence of water droplets at the exterior surface of the windshield and to control a defogging system of the vehicle in response to the presence of fog particles at the interior surface of the windshield, wherein said control is operable to control a headlamp of the vehicle in response to the presence of water droplets at the exterior surface of the windshield.

98. The interior rearview mirror system of claim 97, wherein said control is operable to control a headlamp of the vehicle in response to a level of light present at the windshield.

99. The interior rearview mirror system of claim 97, wherein said imaging array sensor is operable to sense a level of ambient light present at the vehicle.

100. The interior rearview mirror system of claim 99, wherein said control is operable to control the headlamp of the vehicle in response to said imaging array sensor sensing low light conditions.

101. The interior rearview mirror system of claim 97, wherein said control is operable to control a movable window of the vehicle in response to the presence of water droplets at the exterior surface of the windshield.

102. An interior rearview mirror system suitable for use in a vehicle, said interior rearview mirror system comprising:
   an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry for controlling said electrochromic reflective element; and
   a video device, said video device including an imaging array sensor, said imaging array sensor having a field of view forward through the windshield, said imaging array sensor being operable to sense precipitation at at least one of an exterior surface of the windshield and an interior surface of the windshield, said imaging array sensor being operable to sense water droplets at the exterior surface of the windshield and fog particles at the interior surface of the windshield; and
   a control sharing at least one component of said electrochromic control circuitry, said control receiving a signal from said imaging array sensor and being operable to digitally process said signal and to control at least two of (i) headlamp of the vehicle, (ii) a windshield wiper of the vehicle, (iii) a defogging system of the vehicle and (iv) a movable window of the vehicle in response to said signal, said control being operable to control a windshield wiper of the vehicle in response to the presence of water droplets at the exterior surface of the windshield and to control a defogging system of the vehicle in response to the presence of fog particles at the interior surface of the windshield, said control being operable to vary a rate of wipe of a windshield wiper of the vehicle, wherein said control is operable to vary the rate of wipe according to a density of water droplets present at the exterior surface of the windshield.

103. The interior rearview mirror system of claim 102, wherein said control shares said at least one component on a common circuit board of said electrochromic interior rearview mirror assembly.

104. The interior rearview mirror system of claim 102, wherein said control is operable to control a headlamp of the vehicle and to control a windshield wiper of the vehicle in response to said signal.

105. The interior rearview mirror system of claim 102, wherein said control is operable to control a movable window of the vehicle in response to said signal, said movable window comprising a sunroof of the vehicle.

106. The interior rearview mirror system of claim 105, wherein said control is operable to control the sunroof of the vehicle to close the sunroof in response to the presence of precipitation at an exterior surface of the vehicle.

107. The interior rearview mirror system of claim 102, wherein said control comprises a micro-computer having at least one of an embedded control application, a custom digital logic circuit and a digital signal processor circuit.

108. The interior rearview mirror system of claim 102, wherein said control is operable to control a headlamp of the vehicle in response to a level of light sensed at the vehicle.

109. The interior rearview mirror system of claim 108, wherein said imaging array sensor is operable to sense a level of ambient light present at the vehicle.

110. The interior rearview mirror system of claim 109, wherein said control is operable to control a headlamp of the vehicle in response to said imaging array sensor sensing low light conditions.

111. The interior rearview mirror system of claim 102, wherein said control is operable to control at least one other accessory of the vehicle.

112. The interior rearview mirror system of claim 102 including an illumination device for illuminating the field of view of said imaging array sensor.

113. The interior rearview mirror system of claim 112, wherein said illumination device provides infrared illumination.

114. The interior rearview mirror system of claim 112, wherein said illumination device is at least occasionally activated.

115. The interior rearview mirror system of claim 114, wherein said illumination device is pulsed on and off.

116. The interior rearview mirror system of claim 102, wherein said imaging array sensor comprises a pixelated imaging array sensor.

117. The interior rearview mirror system of claim 102, wherein said imaging array sensor comprises a CMOS sensor.

118. The interior rearview mirror system of claim 102, wherein said video device includes a lens disposed between said imaging array sensor and the interior surface of the windshield of the vehicle.

119. The interior rearview mirror system of claim 102, wherein said lens functions establish a small depth of field.

120. The interior rearview mirror system of claim 119, wherein said lens focuses said imaging array sensor on an area at or immediately adjacent to the windshield of the vehicle.

121. An interior rearview mirror system suitable for use in a vehicle, said interior rearview mirror system comprising:

an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry for controlling said electrochromic reflective element; and a video device, said video device including an imagine array sensor, said imaging array sensor having a field of view forward through the windshield, said imaging array sensor being operable to sense fog particles at an interior surface of the windshield; and a control sharing at least one component of said electrochromic control circuitry, said control receiving a signal from said imaging array sensor and being operable to digitally process said signal and to control at least two of (i) a headlamp of the vehicle, (ii) a windshield wiper of the vehicle, (iii) a defogging system of the vehicle and (iv) a movable window of the vehicle in response to said signal, said control being operable to control a defogging system of the vehicle in response to said imaging array sensor sensing fog particles at the interior surface of the windshield, wherein said control is operable to adjust a blower level of the defogging system of the vehicle in response to a density of the fog particles sensed at the interior surface of the windshield.

122. An interior rearview mirror system suitable for use in a vehicle, said interior rearview mirror system comprising:

an electrochromic interior rearview mirror assembly adapted for attachment to an interior portion of the vehicle, said interior rearview mirror assembly comprising a housing and an electrochromic reflective element included within said housing said electrochromic interior rearview mirror assembly comprising electrochromic control circuitry for controlling said electrochromic reflective element; and a video device, said video device including an imaging array sensor, said imaging array sensor having a field of view forward through the windshield, said imaging a array sensor being operable to sense water droplets at an exterior surface of the windshield; and a control sharing at least one component of said electrochromic control circuitry, said control receiving a signal from said imagine array sensor and being operable to digitally process said signal and to control at least two of(i) a headlamp of the vehicle, (ii) a windshield wiper of the vehicle, (iii) a defogging system of the vehicle and (iv) a movable window of the vehicle in response to said signal, said control being operable to control a windshield wiper of the vehicle in response to said imaging array sensor sensing water droplets at the exterior surface of the windshield, said control being operable to adjust a rate of wine of a windshield wiper of the vehicle, said control being operable to control a rear window wiper of the vehicle in response to said imaging array sensor sensing water droplets at the exterior surface of the windshield wherein said control causes a rear window wiper to cycle for every N cycles of a windshield wiper, wherein N is greater than one.

123. The interior rearview mirror system of claim 122, wherein the value of N varies as a function of the speed of a windshield wiper.

124. An interior rearview mirror system suitable for use in a vehicle, said interior rearview mirror system comprising:

an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry for controlling said electrochromic reflective element; and a video device, said video device including an imagine array sensor, said imagine array sensor having a field of view forward through the windshield; and a control sharing at least one component of said electrochromic control circuitry, said control receiving a signal from said imaging array sensor and being operable to digitally process said signal and to control at least two of (i) a headlamp of the vehicle, (ii) a windshield wiper of the vehicle, (iii) a defogging system of the vehicle and (iv) a movable window of the vehicle in response to said signal; and an illumination device for illuminating the field of view of said imaging array sensor, said illumination device being pulsed on and off wherein said imaging array sensor comprises a shutter for exposing said imaging array sensor to the field of view forwardly and through the windshield.

125. The interior rearview mirror system of claim 124, wherein during tow light conditions, said shutter is opened to expose said imaging array sensor to the windshield when said illumination device is pulsed on and closed to not expose said imaging army sensor to the windshield when said illumination device is pulsed off.

126. An interior rearview mirror system suitable for use in a vehicle, said interior rearview mirror system comprising:

an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry for controlling said electrochromic reflective element; and a video device, said video device including an imaging array sensor, said imaging array sensor having a field of view forward through the windshield; and a control sharing at least one component of said electrochromic control circuitry, said control receiving a signal from said imaging array sensor and being operable to digitally process said signal and to control at least two of(i) a headlamp of the vehicle, (ii) a windshield wiper of the vehicle, (iii) a defogging system of the vehicle and (iv) a movable window of the vehicle in response to said signal; and an illumination device for illuminating the field of view of said imaging array sensor, said illumination device being at least occasionally activated, wherein said illumination device is activated during low light conditions.

127. The interior rearview mirror system of claim 126, wherein said imaging array sensor is operable to sense precipitation at at least one of an exterior surface of the windshield and an interior surface of the windshield.

128. The interior rearview mirror system of claim 127, wherein said imaging array sensor is operable to sense water droplets at the exterior surface of the windshield and fog particles at the interior surface of the windshield.

129. The interior rearview mirror system of claim 128, wherein said control is operable to control a windshield wiper of the vehicle in response to the presence of water droplets at the exterior surface of the windshield and to control a defogging system of the vehicle in response to the presence of fog particles at the interior surface of the windshield.

130. The interior rearview minor system of claim 129, wherein said control is operable to vary a rate of wipe of a windshield wiper of the vehicle.

131. The interior rearview mirror system of claim 126, wherein said imaging array sensor is operable to sense fog particles at an interior surface of the windshield, said control being operable to control a defogging system of the vehicle in response to said imaging array sensor sensing fog particles at the interior surface of the windshield.

132. The interior rearview mirror system of claim 126, wherein said imaging array sensor is operable to sense water droplets at an exterior surface of the windshield, said control being operable to control a windshield wiper of the vehicle in response to said imaging array sensor sensing water droplets at the exterior surface of the windshield.

133. The interior rearview mirror system of claim 132, wherein said control is operable to adjust a rate of wipe of a windshield wiper of the vehicle.

134. The interior rearview mirror system of claim 133, wherein said control is operable to adjust the rate of wipe in response to a quantity of the water droplets sensed at the exterior surface of the windshield.

135. The interior rearview mirror system of claim 133, wherein said control is operable to control a rear window wiper of the vehicle.

136. The interior rearview mirror system of claim 135, wherein said control is operable to control a rear window wiper in response to said imaging array sensor sensing water droplets at the exterior surface of the windshield.

137. An interior rearview mirror system suitable for use in a vehicle, said interior rearview mirror system comprising:

an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry for controlling said electrochromic reflective element; and a video device, said video device including an imaging array sensor, said imaging array sensor having a field of view forward through the windshield; and a control sharing at least one component of said electrochromic control circuitry, said control receiving a signal from said imaging array sensor and being operable to digitally process said signal and to control at least two of(i) a headlamp, of the vehicle, (ii) a windshield wiper of the vehicle, (iii) a defogging system of the vehicle and (iv) a movable window of the vehicle in response to said signal; and an illumination device for illuminating the field of view of said imaging array sensor, said illumination device being at least occasionally activated, wherein said imaging array sensor is operable to sense a level of ambient light present at the windshield, said illumination device being activated in response to said imaging array sensor sensing low light conditions.

138. The interior rearview mirror system of claim 137, wherein said control is operable to control a headlamp of the vehicle in response to said imaging array sensor sensing low light conditions.

139. An interior rearview mirror system suitable for use in a vehicle, said interior rearview mirror system comprising:

an electrochromic interior rearview mirror assembly adapted for attachment to an interior portion of the vehicle, said interior rearview mirror assembly comprising a housing and an electrochromic reflective element included within said housing, said electrochromic interior rearview mirror assembly comprising electrochromic control circuitry for controlling said electrochromic reflective element; and a video device, said video device including an imaging array sensor, said imagine array sensor having a field of view forward through the windshield, wherein said video device includes a polarizing filter; and a control sharing at least one component of said electrochromic control circuitry, said control receiving a signal from said imaging array sensor and being operable to digitally process said signal and to control at least two of (i) a headlamp of the vehicle, (ii) a windshield wiper of the vehicle, (iii) a defogging system of the vehicle and (iv) a movable window of the vehicle in response to said signal.

140. The interior rearview mirror system of claim 139, wherein said polarizing filter is at least occasionally positionable between said imaging array sensor and the windshield, said polarizing filter being operable to attenuate polarized light from the windshield.

* * * * *

UNITED STATES PATENT AND TRADEMARK OFFICE
CERTIFICATE OF CORRECTION

PATENT NO. : 6,806,452 B2
APPLICATION NO. : 10/011517
DATED : October 19, 2004
INVENTOR(S) : Brent J. Bos et al.

It is certified that error appears in the above-identified patent and that said Letters Patent is hereby corrected as shown below:

Column 1:
Line 36, Insert --herein by reference-- before "in".

Column 5:
Line 24, Delete "7".
Line 56, "b" should be --by--.

Column 14:
Line 32, "Ω" should be --ω--

Column 23:
Line 5, Claim 6, "imagine" should be --imaging--.
Line 15, Claim 6, "wine" should be --wipe--.
Line 15, Claim 6, Insert --,-- after "vehicle".
Line 48, Claim 15, "rem-view" should be --rear-view--.

Column 24:
Line 34, Claim 29, "magma" should be --imaging--.
Line 52, Claim 30, Insert --system-- after "mirror".
Line 53, Claim 30, Delete "F system".

Column 25:
Line 56, Claim 37, "deforming" should be --defogging--.

Column 26:
Line 22, Claim 39, "imagine" should be --imaging--.

Column 27:
Line 14, Claim 46, "imagine" should be --imaging--.
Line 55, Claim 50, Insert --system-- after "mirror".

Column 28:
Line 14, Claim 50, "for" should be --fog--.
Line 19, Claim 51, "minor" should be --mirror--.
Line 34, Claim 53, "imagine" should be --imaging--.

Column 29:
Line 3, Claim 57, "claim 48" should be --claim 53--.
Line 41, Claim 67, Insert --device-- after "illumination".

UNITED STATES PATENT AND TRADEMARK OFFICE
CERTIFICATE OF CORRECTION

PATENT NO. : 6,806,452 B2
APPLICATION NO. : 10/011517
DATED : October 19, 2004
INVENTOR(S) : Brent J. Bos et al.

It is certified that error appears in the above-identified patent and that said Letters Patent is hereby corrected as shown below:

Column 30:
Line 5, Claim 76, Delete "a" after "imaging".
Line 10, Claim 76, "Process" should be --process--.
Line 11, Claim 76, "of(i)" should be --of (i)--.
Line 15, Claim 76, "foe" should be --fog--.
Line 18, Claim 76, "imagine" should be --imaging--.
Line 19, Claim 76, "foe" should be --fog--.
Line 30, Claim 77, "imagine" should be --imaging--.
Line 35, Claim 77, "imagine" should be --imaging--.
Line 38, Claim 77, "imagine" should be --imaging--.

Column 31:
Line 46, Claim 82, "claim 57" should be --claim 81--.

Column 32:
Line 5, Claim 87, "claim 81" should be --claim 86--.
Line 15, Claim 90, "minor" should be --mirror--.
Line 40, Claim 91, Insert --,-- after "activated".
Line 41, Claim 91, "tight" should be --light--.
Line 33, Claim 91, "of(i)" should be --of (i)--.
Line 55, Claim 93, "imagine" should be --imaging--.

Column 33:
Line 7, Claim 95, ";" should be --:--.
Line 16, Claim 95, "imagine" should be --imaging--.
Line 40, Claim 97, "(or" should be --for--.
Line 42, Claim 97, Delete "a" in the second occurrence.
Line 55, Claim 97, "of(i)" should be --of (i)--.
Line 56, Claim 97, "(ii)" should be --(iii)--.

Column 34:
Line 39, Claim 102, Insert --a-- after "(i)".

Column 35:
Line 39, Claim 119, "claim 102" should be --claim 118--.
Line 55, Claim 121, "imagine" should be --imaging--.

UNITED STATES PATENT AND TRADEMARK OFFICE
CERTIFICATE OF CORRECTION

PATENT NO. : 6,806,452 B2
APPLICATION NO. : 10/011517
DATED : October 19, 2004
INVENTOR(S) : Brent J. Bos et al.

It is certified that error appears in the above-identified patent and that said Letters Patent is hereby corrected as shown below:

Column 36:
Line 13, Claim 122, Insert --,-- after "housing".
Line 19, Claim 122, Delete "a" after "imaging".
Line 24, Claim 122, "imagine" should be --imaging--.
Line 26, Claim 122, "of(i)" should be --of (i)--.
Line 33, Claim 122, "wine" should be --wipe--.
Line 37, Claim 122, Insert --,-- after "windshield".
Line 53, Claim 124, "imagine" should be --imaging--.
Line 54, Claim 124, "imagine" should be --imaging--.
Line 66, Claim 124, Insert --,-- after "off".

Column 37:
Line 2, Claim 125, "tow" should be --low--.
Line 5, Claim 125, "army" should be --array--.
Line 24, Claim 126, "of(i)" should be --of (i)--.
Line 48, Claim 130, "minor" should be --mirror--.

Column 38:
Line 25, Claim 137, "of(i)" should be --of (i)--.
Line 25, Claim 137, Delete "," after "headlamp".
Line 51, Claim 139, "imagine" should be --imaging--.

Signed and Sealed this

Thirteenth Day of November, 2007

JON W. DUDAS
*Director of the United States Patent and Trademark Office*